(12) United States Patent
Hayashi et al.

(10) Patent No.: US 8,718,409 B2
(45) Date of Patent: May 6, 2014

(54) INFORMATION PROCESSING APPARATUS AND METHOD OF CONTROLLING THE SAME

(75) Inventors: Junichi Hayashi, Kamakura (JP); Nobuhiro Tagashira, Nagareyama (JP); Kazuya Kishi, Kawasaki (JP); Yasuhiro Nakamoto, Kawasaki (JP); Yoshiharu Imamoto, Tokyo (JP); Jun Tamaru, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 208 days.

(21) Appl. No.: 12/914,409

(22) Filed: Oct. 28, 2010

(65) Prior Publication Data

US 2011/0103698 A1 May 5, 2011

(30) Foreign Application Priority Data

Nov. 4, 2009 (JP) ................................. 2009-253074
Oct. 13, 2010 (JP) ................................. 2010-230649

(51) Int. Cl.
*G06K 9/60* (2006.01)
*G06K 9/36* (2006.01)

(52) U.S. Cl.
USPC .......................................... 382/305; 382/232

(58) Field of Classification Search
CPC ............. G06T 9/20; G06T 5/007; G06T 7/60; G06T 7/608; G06T 1/0064; H04N 5/3572; H04N 2005/91335
USPC ......................................................... 382/252
See application file for complete search history.

(56) References Cited

U.S. PATENT DOCUMENTS

| | | | |
|---|---|---|---|
| 5,499,294 A | 3/1996 | Friedman | |
| 5,664,018 A * | 9/1997 | Leighton | 380/54 |
| 5,987,162 A * | 11/1999 | Nakata | 382/152 |
| 6,557,103 B1 * | 4/2003 | Boncelet et al. | 713/176 |
| 6,614,915 B2 * | 9/2003 | Powell et al. | 382/100 |
| 6,741,722 B2 * | 5/2004 | Abe | 382/100 |
| 8,175,378 B2 * | 5/2012 | Aldrich et al. | 382/162 |
| 8,194,993 B1 * | 6/2012 | Chen et al. | 382/254 |
| 2004/0042634 A1 * | 3/2004 | Cazier | 382/100 |
| 2004/0101157 A1 * | 5/2004 | Stach | 382/100 |
| 2005/0008191 A1 * | 1/2005 | Wendt | 382/100 |
| 2007/0236594 A1 * | 10/2007 | Hasan et al. | 348/335 |
| 2009/0257586 A1 * | 10/2009 | Takahashi et al. | 380/55 |
| 2009/0316024 A1 * | 12/2009 | Noh | 348/252 |

* cited by examiner

*Primary Examiner* — Jason M Repko
*Assistant Examiner* — Ryan P Potts
(74) *Attorney, Agent, or Firm* — Canon USA, Inc. IP Division

(57) ABSTRACT

In verification of image data of a captured image as to whether it is original one, the verification is possible even for image data subjected to a peripheral illumination correction or an exposure correction. An order information calculation unit selects a pixel set including two or more pixels based on pixel values and information on an image space of image data of a captured image, and calculates an order of magnitude between pixels in the selected pixel set. A verification data producing unit generates verification data used in verification of whether the image data has not been tampered with, based on the calculated order of magnitude. An image output unit outputs the image data and the verification data.

25 Claims, 17 Drawing Sheets

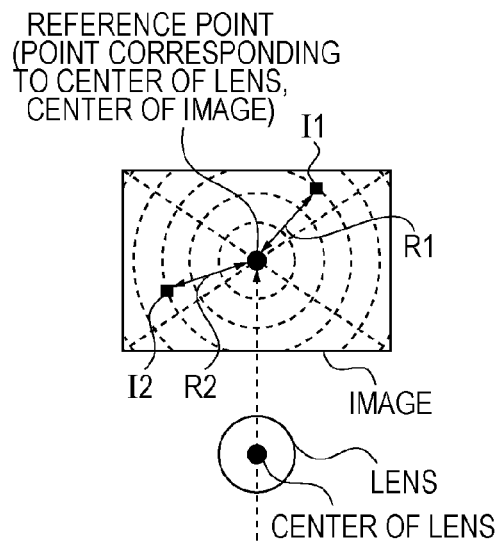
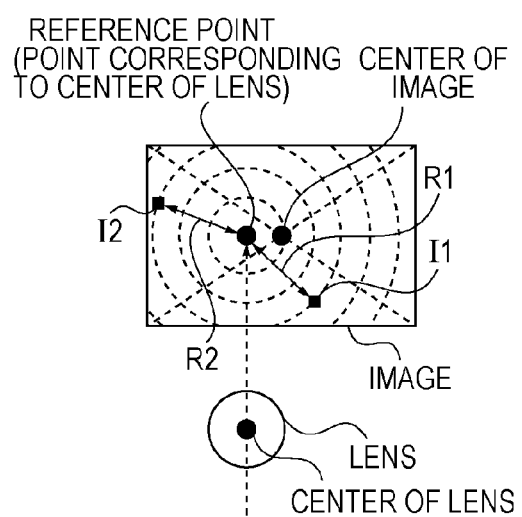
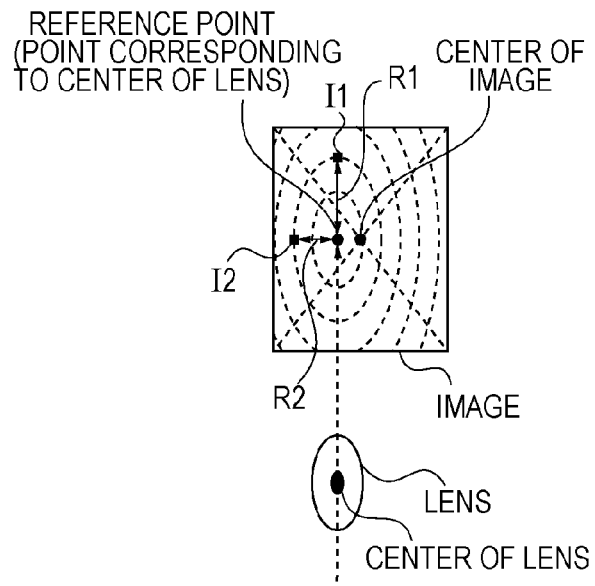

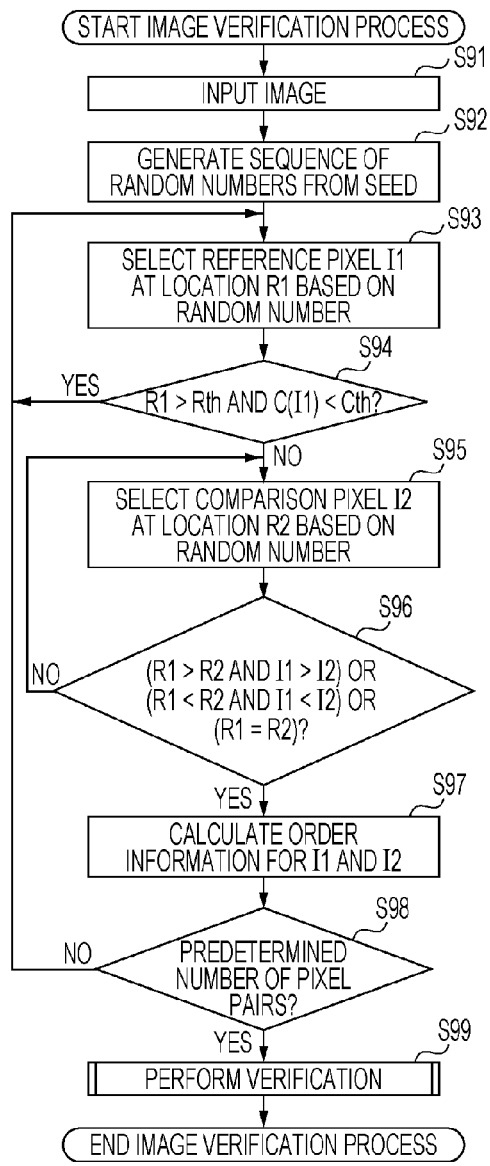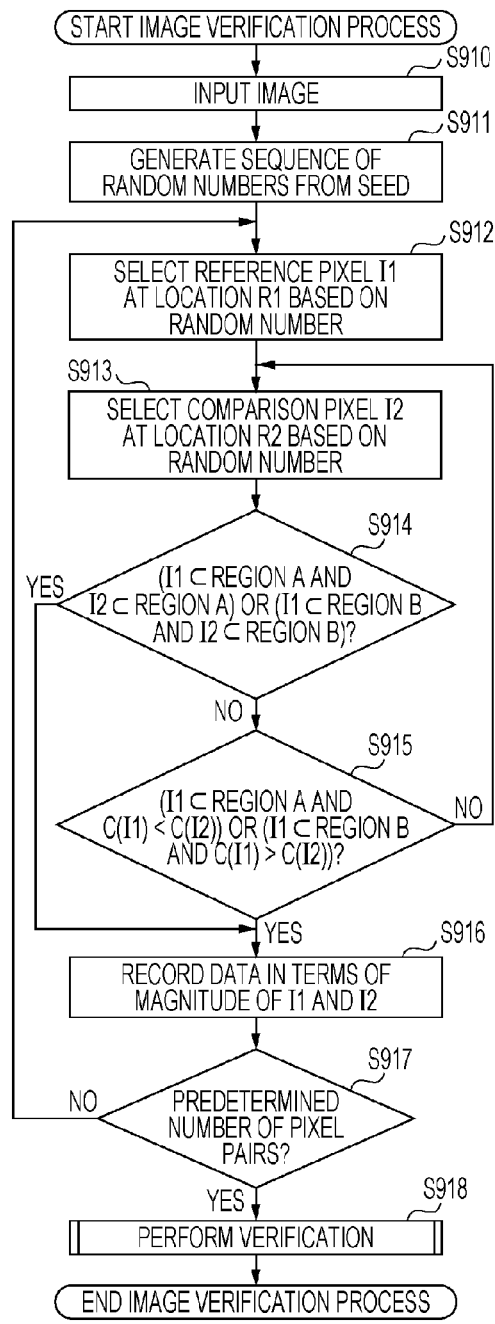

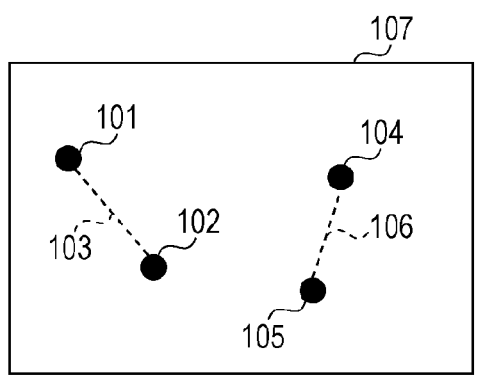

FIG. 12A
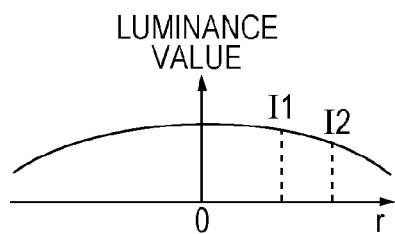
FIG. 12B
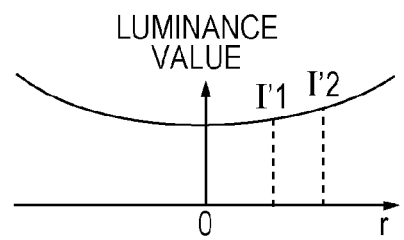
FIG. 12C
| r | Pr |
|---|-----|
| 0 | 1.0 |
| 1 | 0.9 |
| : | : |
| R | 0.5 |
FIG. 12D
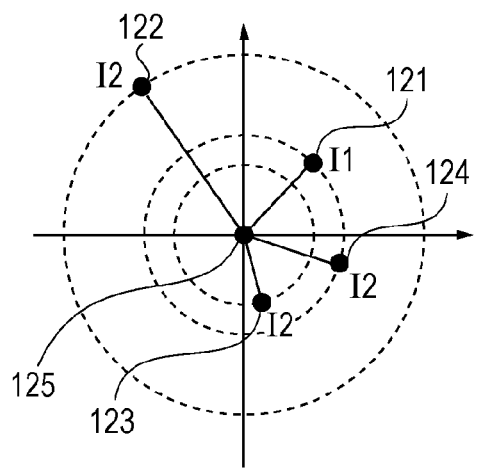

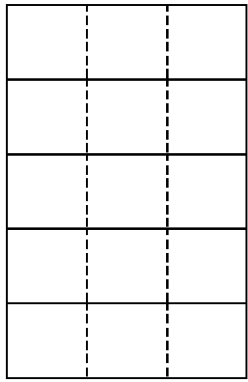
FIG. 14B
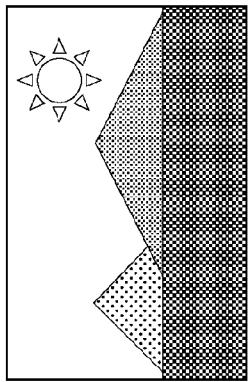
FIG. 14C
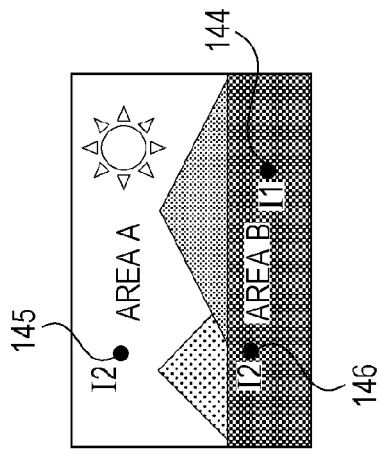
FIG. 14A
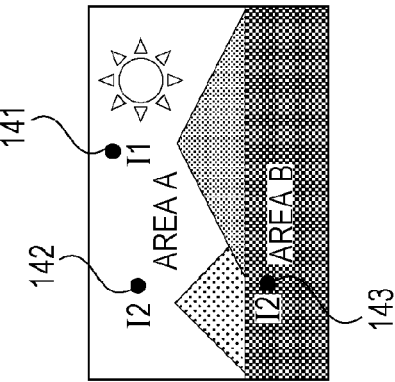
FIG. 14D
FIG. 14E

FIG. 17A

| 6 | 5 | 4 | 3 | 2 | 3 | 4 | 5 | 6 | 7 | 8 |
|---|---|---|---|---|---|---|---|---|---|---|
| 5 | 4 | 3 | 2 | 1 | 2 | 3 | 4 | 5 | 6 | 7 |
| 5 | 4 | 3 | 2 | 1 | 2 | 3 | 4 | 5 | 6 | 7 |
| 5 | 4 | 3 | 2 | 1 | 2 | 3 | 4 | 5 | 6 | 7 |
| 4 | 3 | 2 | 1 | 1 | 1 | 2 | 3 | 4 | 5 | 6 |
| 3 | 2 | 1 | 1 | 0 | 1 | 1 | 2 | 3 | 4 | 6 |
| 4 | 3 | 2 | 1 | 1 | 1 | 2 | 3 | 4 | 5 | 6 |
| 5 | 4 | 3 | 2 | 1 | 2 | 3 | 4 | 5 | 6 | 7 |
| 5 | 4 | 3 | 2 | 1 | 2 | 3 | 4 | 5 | 6 | 7 |
| 5 | 4 | 3 | 2 | 1 | 2 | 3 | 4 | 5 | 6 | 7 |
| 6 | 5 | 4 | 3 | 2 | 3 | 4 | 5 | 6 | 7 | 8 |
| 7 | 6 | 5 | 4 | 3 | 4 | 5 | 6 | 7 | 8 | 9 |

FIG. 17B

| r | Pr |
|---|---|
| 0 | 1.0 |
| 1 | 0.9 |
| 2 | 0.85 |
| : | : |

INFORMATION PROCESSING APPARATUS AND METHOD OF CONTROLLING THE SAME

BACKGROUND OF THE INVENTION

1. Field of the Invention

The present invention relates to a technique to assure that digital data is original.

2. Description of the Related Art

A technique is known to tamper with digital image data taken by a digital camera by using a commercially available tool such as a photo retouching tool. This leads to a reduction in credibility of digital image data compared with film photography. Thus, digital image data is low in admissibility of evidence. To resolve the above problem, U.S. Pat. No. 5,499,294 discloses a technique in which secret information is uniquely assigned to a digital camera and this information is embedded in the digital camera. If an image is taken by the digital camera and image data of the image is produced, then in the digital camera a digital signature is attached to the image data using the secret information whereby it becomes possible to ensure that the image data of the taken image is the original data by verifying the image data using the signature information attached thereto.

Image data of an image taken by a digital camera generally has a characteristic that the illumination in a peripheral area of the image is lower than that in a central area due to an optical characteristic of a lens. That is, the illumination gradually decreases from the center of the image toward the edge of the image. This phenomenon is called peripheral illumination falloff. To deal with the above situation, it is known to perform image processing to correct the reduction in illumination in the peripheral area of the image data. Hereinafter, this correction process will be referred to as a peripheral illumination correction process. More specifically, the ratio of the reduction in illumination in the peripheral area with respect to the illumination at the center is measured in advance, and pixel values are recalculated for the image data of the taken image based on the measured reduction ratio thereby reproducing correct pixel values.

However, in the technique disclosed in U.S. Pat. No. 5,499,294, the peripheral illumination correction is not taken into account. Therefore, if the peripheral illumination correction is performed for image data having a digital signature produced by a digital camera, it is determined in verification that the image data has been tampered with. If the peripheral illumination correction is not performed to prevent the image data from being determined as being tampered with, it is difficult to reproduce correct pixel values for the image data. That is, in the conventional technique, it is difficult to assure that image data is original while the image data is corrected not such that all pixel values are corrected by the same correction factor but such that each pixel is corrected differently to compensate for an inevitable change in pixel values. In particular, it is difficult to perform the peripheral illumination correction while assuring that image data is original. It is also difficult to perform the exposure correction while assuring that image data is original.

SUMMARY OF THE INVENTION

According to an aspect of the present invention, there is provided an apparatus including a selection unit configured to select a pixel set including two or more pixels based on pixel values and information on an image space of image data of a captured image, a calculation unit configured to calculate an order of magnitude between pixels in the selected pixel set, a generation unit configured to generate verification data used in verification of whether the image data has not been tampered with, based on the calculated order of magnitude, and an output unit configured to output the image data and the verification data.

Further features of the present invention will become apparent from the following description of exemplary embodiments with reference to the attached drawings.

BRIEF DESCRIPTION OF THE DRAWINGS

FIGS. 7A to 7C are schematic diagrams illustrating examples of a positional relationship between a lens and an image.

FIGS. 9A and 9B are flow charts illustrating examples of an image verification process.

FIGS. 10A to 10D are diagrams illustrating examples of pixel pairs, values Rk indicating relative magnitudes, and order information R.

FIGS. 12A to 12D are diagrams provided for an illustration of a peripheral illumination correction process.

FIGS. 14A to 14E are diagrams provided for an illustration of a method of producing exposure information and a method of luminance correction.

FIGS. 17A and 17B are diagrams illustrating mask information according to an embodiment of the present invention.

DESCRIPTION OF THE EMBODIMENTS

The present invention is described in further detail below with reference to embodiments in conjunction with the accompanying drawings.

First Embodiment

Figure 1:
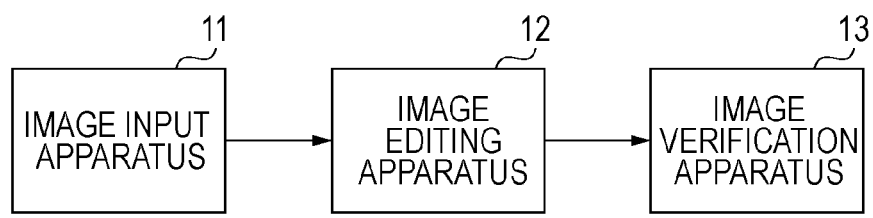
FIG. 1 is a diagram illustrating a general configuration of a system according to an embodiment of the present invention.

FIG. 1 illustrates a system including information processing apparatuses according to a first embodiment of the present invention. More specifically, in the present embodiment, the system includes an image input apparatus 11, an image editing apparatus 12, and an image verification apparatus 13.

The image input apparatus 11 is configured to produce image data and output the produced image data. In particular, in the present embodiment, verification data that allows it to verify whether the image data has been tampered with is produced in addition to the image data and is output together with the image data. The image editing apparatus 12 is configured to perform various kinds of image processing on the image data supplied from the image input apparatus 11 and output resultant image data. The image verification apparatus 13 is configured to verify whether the image data output from the image editing apparatus 12 has not been tampered with, and output a verification result. The image input apparatus 11, the image editing apparatus 12, and the image verification apparatus 13 may be connected to each other via a network such as the Internet so that various kinds of data can be transmitted among them. Alternatively, output data may be stored in a storage medium such as a removable medium and the data may be supplied via the storage medium.

Figure 15A:
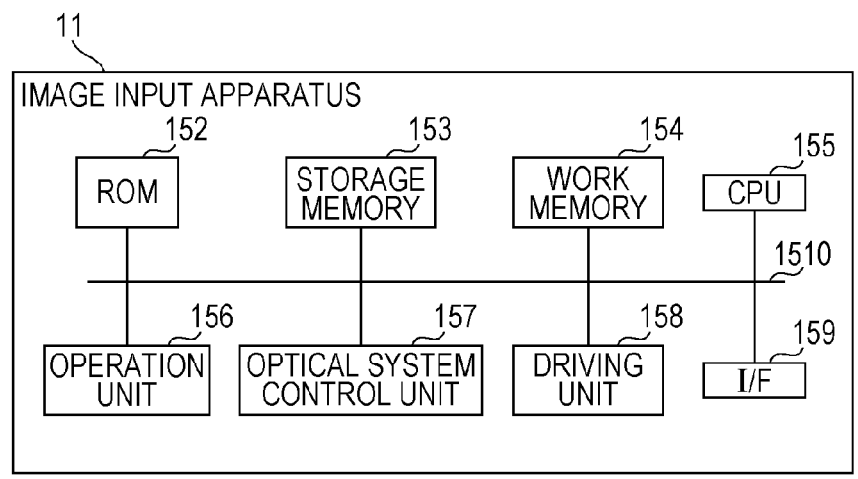
FIGS. 15A and 15B are diagrams illustrating examples of an image input apparatus, an image editing apparatus, and an image verification apparatus.
Figure 15B:
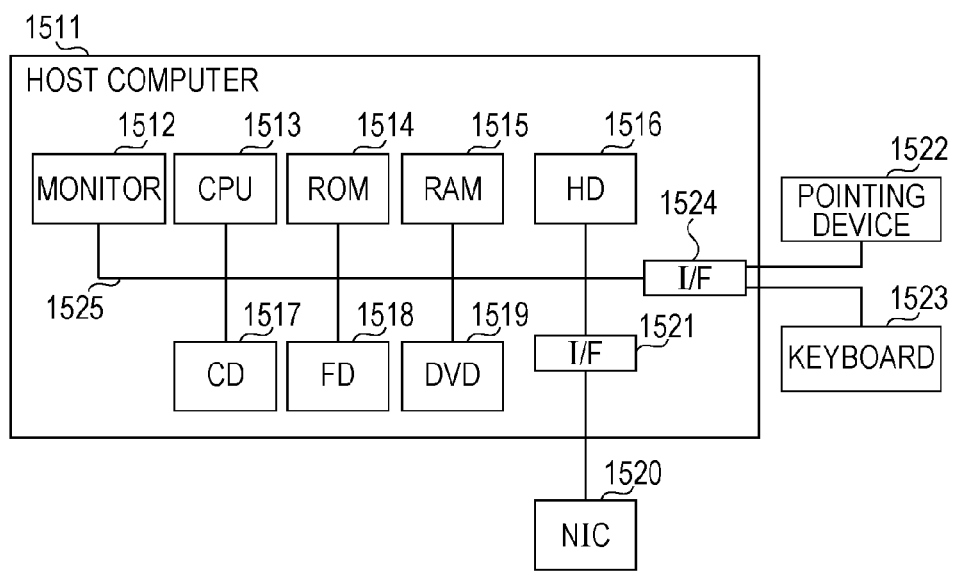

FIGS. 15A and 15B illustrate examples of hardware configurations for the image input apparatus 11, the image editing apparatus 12, and the image verification apparatus 13. FIG. 15A illustrates an example of a hardware configuration of the image input apparatus 11.

The image input apparatus 11 includes a ROM 152, a storage memory 153, a work memory 154, a CPU 155, an operation unit 156, an optical system control unit 157, a driving unit 158, and an interface (I/F) 159. These units are connected to each other via a bus 1510. The image input apparatus 11 is, for example, a digital camera configured such that when an image capture command is issued using the operation unit 156, digital image data of an image formed via a lens controlled by the optical system control unit 157 is produced and stored in the storage memory 153. The ROM 152 is a read-only memory in which an operation program and shared information used in generation of verification data are stored in advance. The storage memory 153 is used to store image data that has already been processed. The work memory 154 is used to temporarily store image data during various processes including a data compression of the image data. If an image capture command is issued, the CPU 155 performs various processes such as an image data compression, verification data generation, etc., in accordance with the program stored in the ROM 152. The operation unit 156 is a user interface that allows a user to input various commands such as an image capture command and commands to set various parameters. The optical system control unit 157 controls an optical sensor such as a CCD sensor or a CMOS sensor so that in response to an image capture command, an image of a subject is taken and electric signal processing and digital signal processing are performed. The driving unit 158 performs a mechanical operation to take an image under the control of the CPU 155. The I/F 159 provides an interface with an external apparatus such as a memory card, a portable device, a communication apparatus, etc. The I/F 159 is used to transmit data such as image data, verification data, etc. to an external apparatus.

FIG. 15B illustrates an example of a hardware configuration of a host computer 1511 serving as the image editing apparatus 12 and the image verification apparatus 13 and also illustrates a relationship between the host computer and peripheral devices.

The host computer 1511 is, for example, a personal computer capable of displaying image data or the like stored in a hard disk (HD) 1516, a CD-ROM disk mounted on a CD-ROM drive 1517, an FD disk mounted on an FD drive 1518, or a DVD disk mounted on a DVD drive 1519 on a monitor 1512. The host computer 1511 is also possible to distribute image data via the Internet or the like using a NIC (network interface card) 1520. A user is allowed to input various commands or the like via a pointing device 1522 or a keyboard 1523. In the inside of the host computer 1511, various blocks described below are connected to each other via a bus 1525 so that various kinds of data are allowed to be transmitted among them. A monitor 1512 displays various kinds of information received from the host computer 1511. A CPU 1513 controls operations of units in the host computer 1511 and executes a program loaded in a RAM 1515. A ROM 1514 stores a BIOS program, a boot program, etc. The RAM 1515 provides a memory area to be used by the CPU 1513 to temporarily store a program and image data being processed. Furthermore, in the RAM 1515, a program executed by an OS or the CPU 1513 is loaded for use in various processes that will be described later. The hard disk (HD) 1516 is used to store the OS and the program to be transferred to the RAM or the like. The HD 1516 is also used to store and read image data during an operation of the host computer 1511. The CD-ROM drive 1517 reads and write data from/to a CD-ROM disk (a CD-R disk, a CD-R/W disk, etc.), which is one type of external storage media, mounted thereon. The FD drive 1518, like the CD-ROM drive 1517, reads and write data from/to an FD (floppy (registered trademark) disk) disk mounted thereon. The DVD-ROM (DVD-RAM) drive 1519, like the CD-ROM drive 1517, reads data from a DVD-ROM disk mounted thereon or reads/writes data from/to a DVD-RAM disk mounted thereon. In a case where an image processing program is stored in a CD-ROM disk, an FD disk, or a DVD-ROM disk, the program may be installed on the HD 1516 so that the program may be loaded from the HD 1516 into the RAM 1515 as required. The image processing program may be stored in a USB memory, and may be installed on the HD 1516 via a USB bus and the bus 1510 so that the image processing program may be installed into the RAM 1515 as required. An I/F 1521 is an interface that allows a NIC (network interface card) 1520 to be connected to the host computer 1511. Thus, the I/F 1521 allows the host computer 1511 to transmit/receive data via the Internet. An I/F 1524 is an interface that allows the pointing device 1522, the keyboard 1523, or the like to be connected to the host computer 1511. A command issued from the pointing device 1522 or the keyboard 1523 is input to the CPU 1513 via the I/F 1524.

Figure 2A:
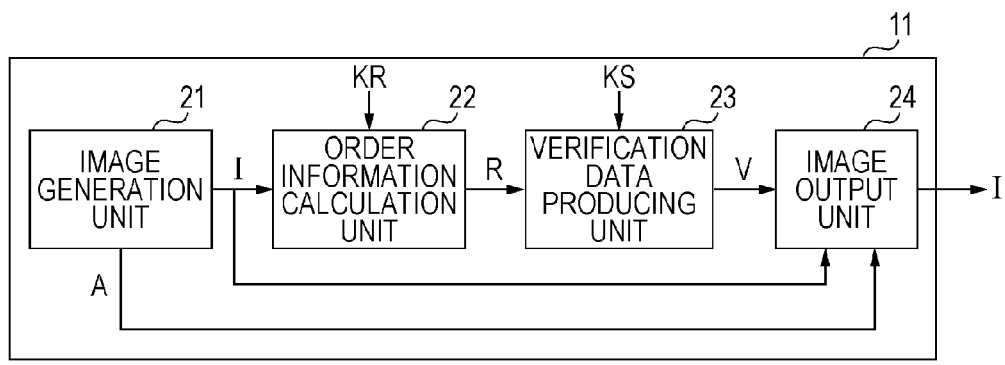
FIGS. 2A and 2B are block diagrams illustrating examples of functional configurations of an image input apparatus.

FIG. 2A is a block diagram illustrating a functional configuration of the image input apparatus 11. In the following explanation, it is assumed that electric power to the image input apparatus 11 has already been turned on and the OS has already been loaded into the work memory 154. Note that the functions may be realized by the host computer 1511. In this case, associated processing units are realized by corresponding programs and the CPU 1513 that executes the programs, and, depending on a situation, peripheral hardware devices.

As shown in FIG. 2A, the image input apparatus 11 includes an image generation unit 21, an order information calculation unit 22, a verification data producing unit 23, and an image output unit 24. Note that an image input process performed by the image input apparatus 11 may be realized in the form of a software process. In this case, the units described above are realized in the form of program modules.

The image generation unit 21 includes an optical sensor such as a CMOS (Complementary Metal Oxide Semiconductor) sensor or a CCD (Charge Coupled Device) sensor and a microprocessor or the like that controls the optical system.

The image generation unit 21 acquires, as image information, a signal produced by the optical system and the optical sensor, and the image generation unit 21 produces image data I based on the acquired image information.

The image data according to the present embodiment is described in further detail below. In general, the optical sensor itself can only detect the intensity of light. To acquire color information, a color filter is generally attached to a front surface of the optical sensor. Therefore, in initial image data produced by the optical sensor, each pixel has only data of one of R, G, and B color components (hereinafter referred to as RGB color components).

In the present embodiment, color components that are not possessed by each pixel are obtained by interpolation from color components of adjacent pixels such that each pixel has all RGB color components. The luminance component of each pixel is then calculated from the obtained RGB color components according to a following mathematical expression (1).

$$Y=0.299R+0.587G+0.114B \quad (1)$$

where Y, R, G, and B are the luminance component, a red component, a green component, and a blue component of the pixel.

Hereinafter, it is assumed that image data I for each pixel represents the luminance component calculated according to mathematical expression (1) described above.

Note that the present embodiment of the invention is not limited to the image data I described above, but other types of image data may be used, such as image data representing color components directly obtained from the optical sensor for the respective pixels. The image data may include extra data obtained by interpolation from existing pixel values to achieve complete color components. When the image generation unit 21 generates image data, the image generation unit 21 generates lens identification information A identifying a lens controlled by the optical system control unit 157. The generated lens identification information A is temporarily stored in the work memory 154 or the like so that the image output unit 24 can add the lens identification information A to the image data I. By using the lens identification information A added in the above-described manner, it becomes possible for an image editing apparatus described later to make a determination based on the lens identification information A as to which optical system was used to produce the image data I. The order information calculation unit 22 produces order information R from the image data I using an initial value of a random number KR and outputs the resultant order information R.

Figure 3A:
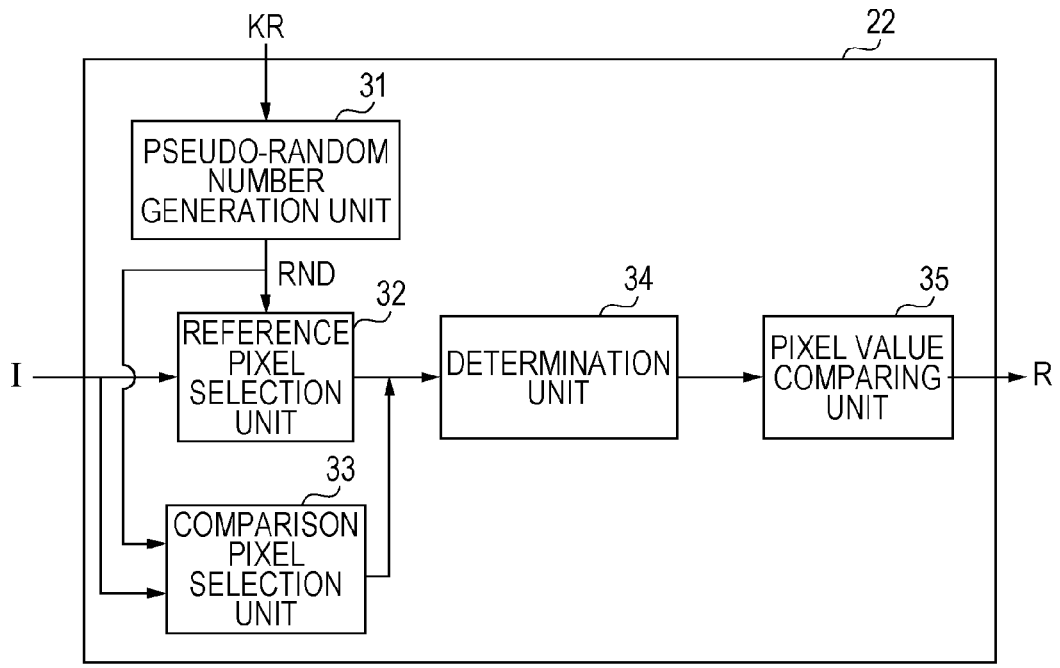
FIGS. 3A and 3B are block diagrams illustrating examples of functional configurations of an order information calculation unit.

FIG. 3A is a functional block diagram illustrating the details of the functional configuration of the order information calculation unit 22. The order information calculation unit 22 includes a pseudo-random number generation unit 31, a reference pixel selection unit 32, a comparison pixel selection unit 33, a determination unit 34, and a pixel value comparing unit 35.

The pseudo-random number generation unit 31 produces a pseudo-random number RND using an input initial value KR as a seed. The generated pseudo-random number RND is output to the reference pixel selection unit 32 and the comparison pixel selection unit 33. Note that the initial value KR input to the pseudo-random number generation unit 31 is shared between the image input apparatus 11 and an image verification apparatus 13 described later. For this purpose, the same initial value KR may be stored in advance in the ROM 152 of the image input apparatus 11 and in the ROM 1514 of the image verification apparatus 13 so that the pseudo-random number generation unit 31 can use the initial value KR as required. Alternatively, the initial value KR may be stored in an IC card or the like resistant to tampering, and the IC card may be connected to the image input apparatus 11 and the image verification apparatus 13 so that the pseudo-random number generation unit 31 can acquire the initial value KR from the IC card. Note that the pseudo-random number generation unit 31 generates the pseudo-random number RND such that the pseudo-random number RND has a different value each time it is generated. That is, different pseudo-random number values are supplied to the reference pixel selection unit 32 and the comparison pixel selection unit 33.

Based on the pseudo-random number RND generated by the pseudo-random number generation unit 31, the reference pixel selection unit 32 and the comparison pixel selection unit 33 respectively select locations of a reference pixel and a comparison pixel from pixels included in the image data I. Thus, one pair of pixels is selected by the reference pixel selection unit 32 and the comparison pixel selection unit 33.

FIG. 10A illustrates an example of a pair of pixels according to the present embodiment of the invention. In this example, image data 107 includes pixels 101, 102, 104, and 105, and pixels 101 and 102 are selected as a pixel pair 103 and pixels 104 and 105 are selected as a pixel pair 106. One of pixels forming a pair is referred to as a reference pixel, and the other pixel is referred to as a comparison pixel. In the present embodiment, a plurality of pixel pairs are generated and output by repeatedly performing the pixel pair selection process. In the example shown in FIG. 10A, the pixel pair 103 and the pixel pair 106 are output. In the present embodiment, in a case where the reference pixel selected by the reference pixel selection unit 32 is located in a peripheral area of the image and has a value smaller than a predetermined threshold value, the reference pixel is discarded and another reference pixel is selected based on a random number.

The reference pixel selected by the reference pixel selection unit 32 and the comparison pixel selected by the comparison pixel selection unit 33 are input to the determination unit 34. The determination unit 34 determines whether the input reference pixel and the comparison pixel satisfy a particular condition described later. If it is determined that the particular condition is satisfied, a process of the pixel value comparing unit 35 is performed but otherwise a process of the comparison pixel selection unit 33 is performed.

In the case where the determination made by the determination unit 34 is that the reference pixel and the comparison pixel satisfy the particular condition, the determination unit 34 supplies the reference pixel and the comparison pixel to the pixel value comparing unit 35. The pixel value comparing unit 35 compares the supplied reference pixel and comparison pixel, and outputs order information R indicating a result of comparison. In the present embodiment of the invention, the pixel value comparing unit 35 produces the order information R according to a following mathematical expression (2).

$$\text{if } C(I1) \leq C(I2) \text{ then } Rk=0$$

$$\text{else if } C(I1) > C(I2) \text{ then } Rk=1 \quad (2)$$

where C(x) is a pixel value at a pixel location x, I1 is a pixel location of the reference pixel selected by the reference pixel selection unit 32, and I2 is a pixel location of the comparison pixel selected by the comparison pixel selection unit 33.

A value Rk indicating a relative magnitude (i.e., indicating which pixel value is relatively greater (smaller) than others) is calculated according to mathematical expression (2) for the given reference pixels and comparison pixels, and order information R is produced by concatenating the calculated values Rk.

FIGS. 10B, 10C, and 10D illustrates specific examples of values Rk indicating relative magnitudes and order information R. That is, FIG. 10B illustrates image data to be subjected to the calculation of order information R. In FIG. 10B, each box, in which a numeral value (pixel value) is described, represents a pixel. The pixels are assigned sequentially pixel numbers starting with "0" at the upper left corner in order of raster scanning. Thus, for example, pixel values for particular pixel numbers are given as follows: C(0)=128, C(1)=150, C(2)=121, etc.

Furthermore, pseudo-random numbers RND generated by the pseudo-random number generation unit 31 are assigned to the reference pixel 11 and the comparison pixel 12. FIG. 10C illustrates an example in which pseudo-random numbers RND are assigned to reference pixels 11 and comparison pixels 12. In the example shown in FIG. 10C, six pseudo-random numbers (8, 5, 0, 2, 9, and 14) are generated, and three pixel pairs are produced.

According to the pseudo-random numbers (8, 5, 0) assigned to 11, the reference pixel selection unit 32 selects reference pixels. In this example, three pixels C(8)=118, C(5)=185, and C(0)=128 are selected as reference pixels. Similarly, according to the pseudo-random numbers (2, 9, 14) assigned to 12, the comparison pixel selection unit 33 selects comparison pixels. In this example, three pixels C(2)=121, C(9)=170, and C(14)=115 are selected as comparison pixels.

Next, the value Rk indicating the relative magnitude is calculated for each pixel pair according to mathematical expression (2). For example, in the case of the first pair of pixels C(I1)=118 and C(I2)=121 shown in FIG. 10C, C(I1)<C(I2) and thus Rk=0. Similarly, values Rk indicating relative magnitudes are calculated for the second and third pixel pairs.

The calculated values Rk of the respective pixel pairs are sequentially concatenated to obtain order information R. In this specific example, "011" is obtained as the order information R as shown in FIG. 10D.

In the example described above, reference pixels and comparison pixels are selected. Alternatively, blocks including a plurality of pixels may be selected as reference blocks and comparison blocks.

Figure 3B:
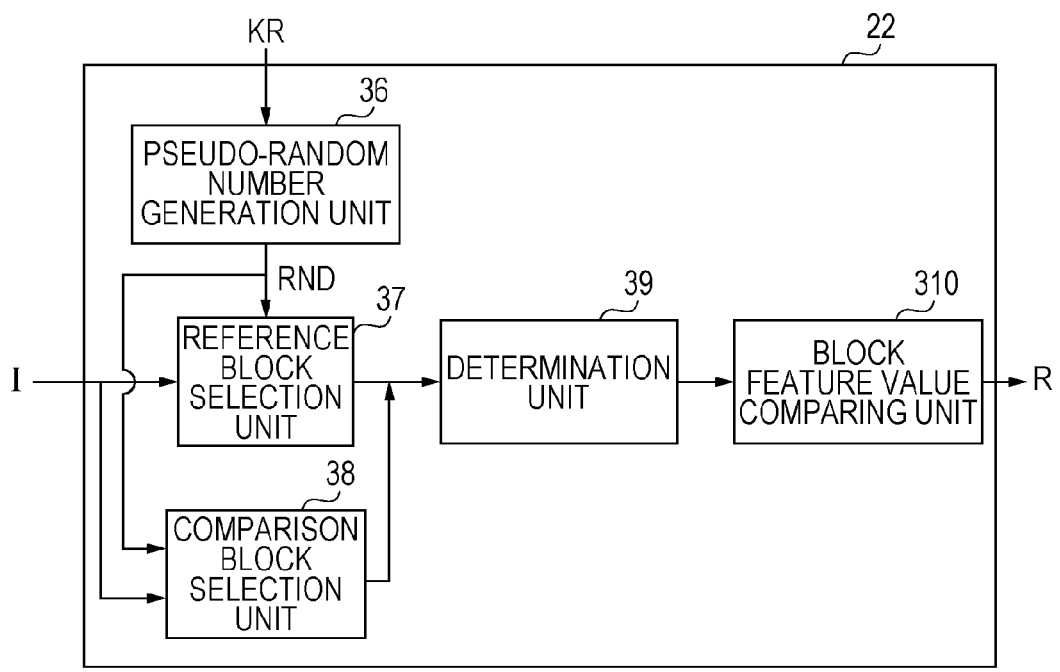

FIG. 3B is a functional block diagram illustrating the order information calculation unit 22 configured to select blocks instead of pixels. In this configuration, the order information calculation unit 22 includes a pseudo-random number generation unit 36, a reference block selection unit 37, a comparison block selection unit 38, a determination unit 39, and a block feature value comparing unit 310. The pseudo-random number generation unit 36 is similar to the pseudo-random number generation unit 31, and thus a further description thereof is omitted.

The reference block selection unit 37 and the comparison block selection unit 38 select locations of reference blocks and comparison blocks from image data I according to pseudo-random numbers RND generated by the pseudo-random number generation unit 36. More specifically, locations in the image data are specified by coordinates using pseudo-random numbers generated by the pseudo-random number generation unit 36, and blocks are specified such that each specified coordinate is located in the upper left corner of a block.

Note that in the present embodiment of the invention, the manner of specifying blocks is not limited to that described above. For example, blocks may be specified such that a specified coordinate is located at the center, the upper right corner, the bottom right corner, or the bottom left corner of one block. Alternatively, each rectangular block may be assigned a rectangular block number and reference blocks and comparison blocks may be selected by specifying rectangular block numbers according to generated pseudo-random numbers. That is, any method may be employed as long as reference blocks and comparison blocks are randomly selected using pseudo-random numbers RND.

The reference block selection unit 37 and the comparison block selection unit 38 calculate the feature values of the selected blocks. As for the feature value of each block, in the present embodiment, the average value of pixel values included in the block is employed. Note that the present embodiment of the present invention is not limited to the manner of calculating the feature value. For example, the variance, the standard deviation, the median of the pixel values, or other feature values may be employed.

The reference block and the comparison block selected by the reference block selection unit 37 and the comparison block selection unit 38 are input to the determination unit 39. The determination unit 39 determines whether the input reference block and comparison block satisfy a particular condition described later. In a case where it is determined that the particular condition is satisfied, the determination unit 39 controls the processing flow such that a following process is performed by the block feature value comparing unit 310, but otherwise a following process is performed by the comparison block selection unit 38. The details of the control and determination process performed by the determination unit 39 will be described later.

In a case where the determination made by the determination unit 39 is that reference block and the comparison block satisfy the particular condition, the determination unit 39 supplies the reference block and the comparison block to the block feature value comparing unit 310. The block feature value comparing unit 310 compares the feature values of the supplied blocks with each other and produces order information R indicating the comparison result.

The producing of the order information R by the block feature value comparing unit 310 is performed according to a following mathematical expression.

$$\text{If } Ave(B1) \leq Ave(B2) \text{ then } Rk=0$$

$$\text{else if } Ave(B1) > Ave(B2) \text{ then } Rk=1 \qquad (2')$$

where Ave(x) denotes the average value of pixel values of a block at a block location x, and B1 and B2 denote block locations of the reference block and the comparison block selected the by the reference block selection unit 37 and the comparison block selection unit 38.

Referring again to FIG. 2A, the functional blocks of the image input apparatus 11 are further described below.

The verification data producing unit 23 acquires the order information R generated by the order information calculation unit 22 and produces verification data V associated with the acquired order information R. The resultant verification data V is output to the image output unit 24. The details of the process performed by the verification data producing unit 23 to produce the verification data V will be described later.

The image output unit 24 acquires the image data I output from the image generation unit 21 and the verification data V output from the verification data producing unit 23, and the image output unit 24 adds the verification data V to the image data I. More specifically, the verification data V is described in a header of the image data I in an Exif format or the like. Note that in the present embodiment of the invention, the method of adding the verification data V to the image data I is not limited to this. For example, the verification data V may be concatenated with the image data I. Note that lens identification information A stored in the work memory 154 is also added to the image data I. The image output unit 24 stores the image data I in a storage medium such as a removable medium or transmits the image data I to a particular host device via a wired or wireless network.

Figure 6A:
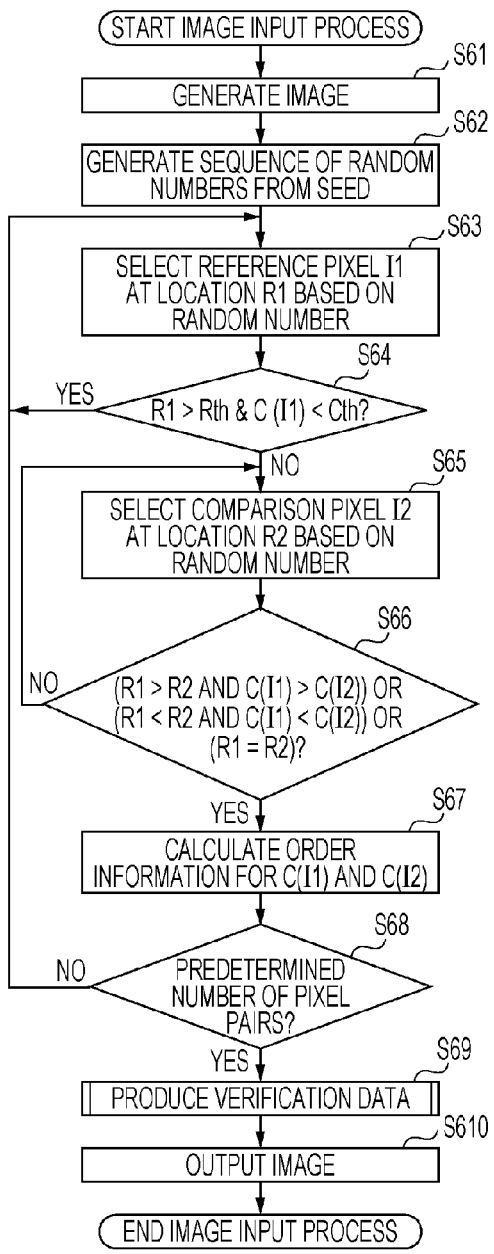
FIGS. 6A and 6B are flow charts illustrating examples of an image input process.

FIG. 6A is a flow chart illustrating an image input process performed in the image input apparatus 11.

First, in step S61, the image generation unit 21 generates image data I. Next, in step S62, a pseudo-random number generation unit 31 generates a pseudo-random number RND.

Next, in step S63, the reference pixel selection unit 32 selects a reference pixel using the generated pseudo-random number. Next, in step S64, the reference pixel selection unit 32 determines whether the selected reference pixel satisfies a condition defined by a following mathematical expression (3).

$$R1 > Rth \text{ and } C(I1) < Cth \quad (3)$$

where R1 denotes a distance of the reference pixel from a center of an image, C(I1) denotes a pixel value of the reference pixel I1, Rth denotes a threshold value associated with the distance from the center of the image, and Cth denotes a threshold value associated with the pixel value of the reference pixel.

In a case where it is determined in step S64 that the condition expressed in (3) is satisfied, step S63 is performed again to select another reference pixel. In step S63, the reference pixel selection unit 32 selects a new reference pixel I1 using a new pseudo-random number.

On the other hand, in a case where it is determined in step S64 that condition (3) is not satisfied, the process proceeds to step S65. In step S65, the comparison pixel selection unit 33 selects a comparison pixel based on a generated pseudo-random number. In step S66, the determination unit 34 determines whether the selected reference pixel and the comparison pixel satisfy a condition defined by a following mathematical expression (4).

$$(R1 > R2 \text{ and } C(I1) > C(I2))$$

or $$(R1 < R2 \text{ and } C(I1) \leq C(I2))$$

or $$(R1 = R2) \quad (4)$$

where R1 and R2 denote distances of the reference pixel and the comparison pixel from the center of the image, C(x) denotes a pixel value at a pixel location x, and I1 and I2 denote pixel locations of the reference pixel and the comparison pixel.

Note that in the present embodiment, it is assumed as shown in FIG. 7A that the center of the image is coincident with the center of a lens controlled by the optical system control unit 157, and R1 and R2 are distances as measured from the center of the image. Furthermore, in the present embodiment, the distances R1 and R2 are expressed in Euclidean distance, although the expression of the distances is not limited to Euclidean distance, but the distances may be expressed in other various ways such as a 4-neighbor distance, a 8-neighbor distance, etc.

Figure 16A:
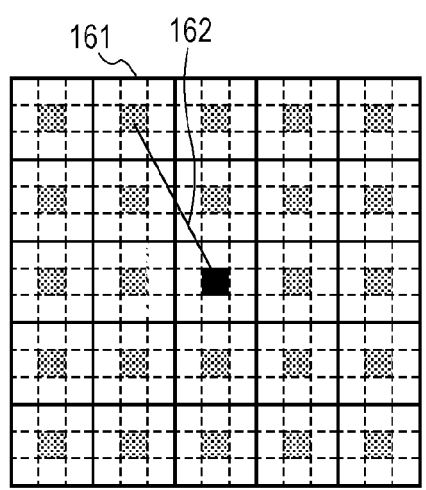
FIGS. 16A and 16B are diagrams illustrating examples of a distance according to an embodiment of the present invention.
Figure 16B:
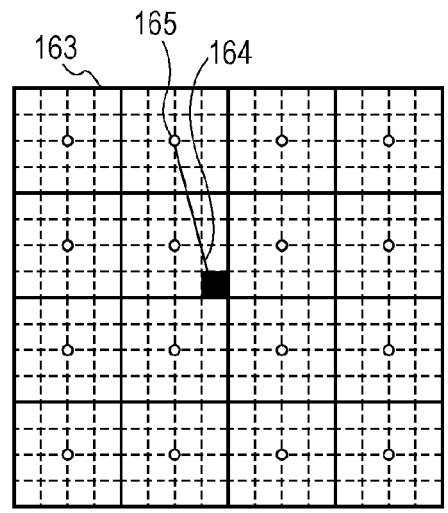

In the case where the process is performed in units of blocks as in the example shown in FIG. 3B, distances of blocks from the center of the image are employed as R1 and R2. Referring to FIGS. 16A and 16B, specific examples of methods of defining a distance is described below for a case where the image data is processed in units of bocks.

In FIGS. 16A and 16B, boxes represented by dotted lines denote pixels and boxes represented by solid lines denote blocks. In the example shown in FIG. 16A, each block includes 3×3 pixels, while each block includes 4×4 pixels, in the example shown in FIG. 16B. In FIGS. 16A and 16B, solid squares are at the center of the image (also at the center of the lens, in this case). In the following description, it is assumed that the center of a pixel in the top left corner is at coordinates (0, 0), and it is also assumed that an x axis extends in a horizontal direction and a y axis extends in a vertical direction. In both examples shown in FIGS. 16A and 16B, the center of the image is at coordinates (7, 7).

In the example shown in FIG. 16A, each shaded box indicates a pixel located at the center of a block. The distance (R1 or R1) of a particular block is defined by the distance of the pixel located at the center of the block from the center of the image. The calculation of the distance is performed using coordinates of the center of the block and coordinates of the center of the image. For example, the distance of a block 161 from the center of the image is given by a distance 162. In this case, the center of the block 161 is at coordinates (4, 1), and thus the distance of this block from the center of the image is calculated as $\sqrt{(7-4)^2+(7-1)^2}=\sqrt{45}$.

On the other hand, in the example shown in FIG. 16B, the center of each block is represented by an open circle. For example, the center of a block 163 is denoted by a circle 165. Note that in the example shown in FIG. 16B, each block includes 4×4 pixels, and thus there is no pixel at the center of the block. In this case, the center of each block is defined by coordinates corresponding to an open circle as shown in FIG. 16B, and the distance (R1 and R2) is calculated from the coordinates indicating the center of the block and the coordinates of the center of the image. For example, the distance of a block 163 from the center of the image is given by a distance 164 shown in FIG. 16B. In this case, the center of the block 163 is at coordinates (5.5, 1.5), and thus the distance of this block from the center of the image is calculated as $\sqrt{(7-5.5)^2+(7-1.5)^2}=\sqrt{42.625}$. The method of defining the distance for blocks has been described above.

Note that in the present embodiment of the invention, the method of defining the distance is not limited to that described above. For example, in a case where the center of the lens corresponds to a point in the image other than the center of the image as is the case with the example shown in FIG. 7B, the point in the image to which the center of the lens corresponds may be employed as a reference point (reference location), and distances R1 and R2 may be defined with respect to this reference point.

Depending on the lens characteristic, there is a possibility that an inversion occurs in relative magnitudes of pixels in a pixel pair at equal distances from a reference point, as in the example show in FIG. 7C. In this case, for example, information about the lens characteristic may be described in an Exif format or the like and may be attached to the image data of the captured image. Based on this information, pixel pairs may be selected not according to the distance from the reference point such that substantially the same correction is performed on two pixels in each pair so that no inversion occurs in the relative magnitudes.

For example, mask information such as that shown in FIG. 17A may be attached as the information representing the lens characteristic. In the mask information shown in FIG. 17A, each box corresponds to one of pixels of image data. For pixels having equal values described in boxes, the correction process is performed in the exactly same manner. In a case where the center of the lens is located at a point deviated from the center of the image, i.e., in a case where the reduction in illumination in the peripheral area occurs not such that the amount of reduction is equal on a circle but such that the amount of reduction is equal on an ellipse as in the example shown in FIG. 7C, the reduction in illumination in the peripheral area can be expressed by mask information as shown in FIG. 17A. In a table shown in FIG. 17B, reduction ratios are described for various values described in the mask information shown in FIG. 17A. The reduction ratio will be described in further detail later.

In a case where the mask information is used, the distances R1 and R2 in the condition (4) are expressed not in Euclidean distance but expressed by values described in the mask information and more specifically in boxes corresponding to pixels.

In a case where it is determined in step S66 that the condition expressed in (4) is satisfied, the process proceeds to step S67. On the other hand, in a case where it is determined in step S66 that the condition expressed in (4) is not satisfied, the processing flow returns to step S65.

In step S65, the comparison pixel selection unit 33 selects a new comparison pixel 12 using a new pseudo-random number. Thereafter, the determination step in step S66 is again performed. If a pair of a reference pixel and a comparison pixel is finally selected which satisfies the condition expressed in (4), the process proceeds to step S67.

Note that in the repetition of the above process, reference pixels and comparison pixels are selected such that the pixel value is greater for pixels located farther from the center of the image than for pixels located closer to the center of image or such that the selected reference pixels and comparison pixels are located on concentric circles centered at the center of the image. A description will be given later of a reason why pixel pairs are selected such that the condition expressed in (4) is satisfied.

Note that depending on a characteristic of the lens, there is a possibility that reference pixels and comparison pixels are not selected from pixels located on concentric circles centered at the center of the image, as in the example shown in FIG. 7C. In step S67, the pixel value comparing unit 35 produces order information Rk from the reference pixel and the comparison pixel according to mathematical expression (2). Next in step S68, the pixel value comparing unit 35 determines whether a predetermined number of pixel pairs have been selected.

If it is determined in step S68 that the predetermined number of pixel pairs have been selected, the process proceeds to step S69, but otherwise the processing flow returns to step S63 to repeat the process from step S63. In step S69, the verification data producing unit 23 produces verification data V from the order information R produced in step S67. Next, in step S610, the image output unit 24 outputs the image data with the verification data V added thereto.

In the case where the process is performed in units of not pixels but blocks as shown in FIG. 3B, the pixel treated in each step in FIG. 6A is replaced with a block as described below.

In step S61, the image generation unit 21 generates image data I. Next in step S62, the pseudo-random number generation unit 36 generates a pseudo-random number RND. Next in step S63, the reference block selection unit 37 selects a reference block using the generated pseudo-random number.

In step S64, the reference block selection unit 37 determines whether the selected reference block satisfies a condition defined by a following mathematical expression (3').

$$R1 > Rth \text{ and } \text{Ave}(B1) < Ath \quad (3')$$

where R1 denotes the distance between the center of the block and the center of the image, Ave(B1) denotes the average pixel value of the reference block B1, Rth denotes a threshold value associated with the distance from the center of the image, Ath denotes a threshold value associated with the average pixel value of the reference block.

In a case where it is determined in step S64 that the condition expressed in (3') is satisfied, the process proceeds to step S63 to select another reference block. In step S63, the reference block selection unit 37 selects a new reference block B1 using a new pseudo-random number. On the other hand, in a case where it is determined in step S64 that condition (3') is not satisfied, the process proceeds to step S65. In step S65, the comparison block selection unit 38 selects a comparison block based on a generated pseudo-random number.

In step S66, the determination unit 39 determines whether the selected reference block and the comparison block satisfy a condition defined by a following mathematical expression (4').

$$(R1 > R2 \text{ and } \text{Ave}(B1) > \text{Ave}(B2))$$

or $$(R1 < R2 \text{ and } \text{Ave}(B1) \leq \text{Ave}(B2))$$

or $$(R1 = R2) \quad (4')$$

where Ave(x) denotes the average pixel value of a block at a block location x, and B1 and B2 denote locations of the reference block and the comparison block.

In a case where it is determined in step S66 that the condition expressed in (4') is satisfied, the process proceeds to step S67. On the other hand, in a case where it is determined in step S66 that the condition expressed in (4') is not satisfied, the processing flow returns to step S65. In step S65, the comparison block selection unit 37 selects a new reference block B2 using a new pseudo-random number. Thereafter, the determination step in step S66 is again performed. If a pair of a reference block and a comparison block is finally selected which satisfies the condition expressed in (4'), the process proceeds to step S67. In step S67, the block feature value comparing unit 310 produces order information Rk from the reference block and the comparison block according to mathematical expression (2'). Next in step S68, the block feature value comparing unit 310 determines whether a predetermined number of block pairs have been selected. If it is determined in step S68 that the predetermined number of block pairs have been selected, the process proceeds to step S69, but otherwise the processing flow returns to step S63 to repeat the process from step S63.

In step S69, the verification data producing unit 23 produces verification data V from the order information R produced in step S67. Next, in step S610, the image output unit 24 outputs the image data with the verification data V added thereto.

FIGS. 8A to 8D are flow charts illustrating examples of a process of producing verification data in step S69.

Figure 8A:
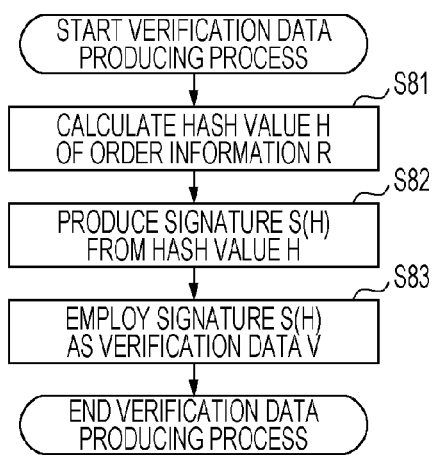
FIGS. 8A to 8D are flow charts illustrating examples of a process of producing verification data.

In the example of the process shown in FIG. 8A, an electronic signature is used as the verification data.

First, in step S81, the verification data producing unit 23 calculates a hash value H by inputting the given order information R into a hash function. As for the hash function, various known hash functions such as SHA-1, MD5, or the like may be employed. Next, in step S82, the verification data producing unit 23 produces an electronic signature S(H) from the hash value produced in the previous step. As for an algorithm of producing the electronic signature, many known digital signature algorithm such as RSA, DSA, etc., may be employed.

Next, in step S83, the verification data producing unit 23 outputs the produced electronic signature S(H) as the verification data V. Note that in the case where the electronic signature is used as the verification data, a secret key used in producing the electronic signature is input as a signing key KS.

For the above purpose, the signing key KS may be stored in advance in the ROM 152 in the image input apparatus 11 so that the verification data producing unit 23 can use the signing key KS as required. Alternatively, the signing key KS may be stored in an IC card or the like, and the IC card may be connected to the image input apparatus 11 so that the verification data producing unit 23 can acquire the signing key KS from the IC card and use it. Alternatively, a new signing key KS may be produced in the image input apparatus 11 and the produced signing key KS may be used. In any case, a public key corresponding to the signing key KS used by the verification data producing unit 53 is required in a process performed by the image verification apparatus 13 as described later.

Therefore, the image output unit 24 may transmit the public key corresponding to the signing key KS to the image verification apparatus 13 by attaching it to the image data. Alternatively, the public key may be stored on a server (not shown) and information (for example, URL) indicating the location of the public key on the server may be described in the image data so that the image verification apparatus 13 can acquire, as required, the public key from the server based on the information indicating the location where the public key.

Figure 8B:
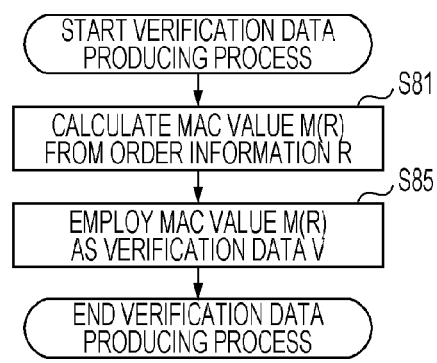

FIG. 8B is a flow chart illustrating an example of a process in which MAC (Message Authentication Code) is used as the verification data.

First, in step S84, the verification data producing unit 23 produces a MAC value M(R) from given order information R. Next, in step S85, the verification data producing unit 23 outputs the produced MAC value M(R) as the verification data V. As for an algorithm of producing the MAC value, many known algorithms such as HMAC, CMAC, etc., may be employed. In the case where the MAC is used as the verification data, a secret key to be used in producing the MAC is input as a signing key KS, and the MAC is produced based on the input secret key.

The signing key KS is shared by the image input apparatus 11 and the image verification apparatus 13 described later. For this purpose, common secret information may be stored in advance in the ROM 152 of the image input apparatus 11 and also in the ROM 1514 of the image verification apparatus 13 so that the verification data producing unit 23 can use the secret information as required. Alternatively, the signing key KS may be stored in an IC card or the like, and the IC card may be connected to the image input apparatus 11 and the image verification apparatus 13 so that the verification data producing unit 23 can acquire the signing key KS from the IC card and use it. Alternatively, new secret information may be produced in the image input apparatus 11 and the produced secret information may be used as the signing key KS. In this case, the produced secret information may be stored in the IC card or the like or encrypted and transmitted to the image verification apparatus 13.

Figure 8C:
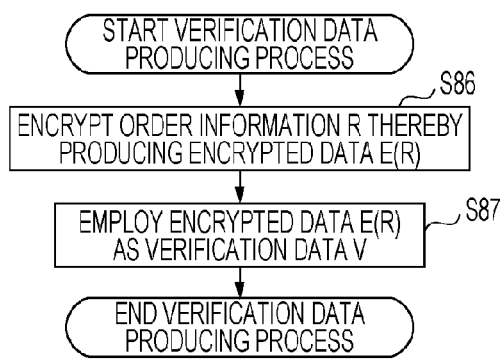

FIG. 8C is a flow chart illustrating an example of a process in which encrypted order information R is used as the verification data. First, in step S86, the verification data producing unit 23 produces encrypted data E(R) by encrypting given order information R according to an encryption algorithm.

Next, in step S87, the verification data producing unit 23 outputs the produced encrypted data E(R) as the verification data V. In the encryption, a common key encryption algorithm such as DES or AES or public key encryption algorithm such as RSA may be employed. In a case where the common key encryption is employed, secret information used as a common key is shared in advance by the image input apparatus 11 and the image verification apparatus 13. On the other hand, in a case where the public key encryption is employed, a public key and a corresponding secret key may be respectively stored in advance in the image input apparatus 11 and the image verification apparatus 13.

Figure 8D:
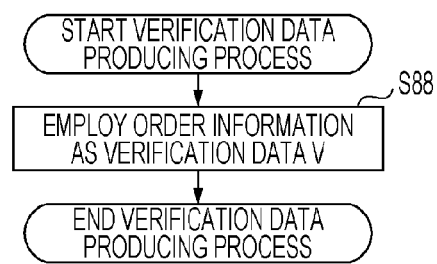

FIG. 8D is a flow chart illustrating an example of a process in which the order information R itself is used as the verification data. In this case, in step S88, the verification data producing unit 23 outputs the given order information R as the verification data V.

Note that although in the present embodiment, a pair of pixels, i.e., a set of two pixels is selected using the reference pixel selection unit 32 and the comparison pixel selection unit 33, a set of three or more pixels may be selected. For example, in a case where a set of three pixels is selected, a first comparison pixel and a second comparison pixel are selected in conjunction with one reference pixel. In this case, the determination in step S66 is performed using the condition (4") shown below instead of the condition (4).

$$(R1>R2>R3 \text{ and } C(I1)>C(I2)>C(I3))$$

or $$(R1<R2<R3 \text{ and } C(I1) \leq C(I2) \leq C(I3))$$

or $$(R1=R2=R3) \tag{4"}$$

where R1, R2, and R3 respectively denote distances of the reference pixel, the first comparison pixel, and the second comparison pixel from the center of the image, C(x) denotes a pixel value at a pixel location x, and I1, I2, and I3 respectively denote pixel locations of the reference pixel, the first comparison pixel, and the second comparison pixel.

In this case, the pixel value comparing unit 35 determines the order information R according to mathematical expression (2') instead of mathematical expression (2).

$$\text{if } C(I1) \leq C(I2) \leq C(I3) \text{ then } Rk=0$$

$$\text{else if } C(I1) \leq C(I3) < C(I2) \text{ then } Rk=1$$

$$\text{else if } C(I2) < C(I1) \leq C(I3) \text{ then } Rk=2$$

$$\text{else if } C(I2) \leq C(I3) < C(I1) \text{ then } Rk=3$$

$$\text{else if } C(I3) < C(I1) \leq C(I2) \text{ then } Rk=4$$

$$\text{else if } C(I3) < C(I2) < C(I1) \text{ then } Rk=5 \tag{2'}$$

where C(x) denotes a pixel value at a pixel location x, and I1, I2, and I3 respectively denote locations of the reference pixel, the first comparison pixel, and the second comparison pixel.

Figure 4A:
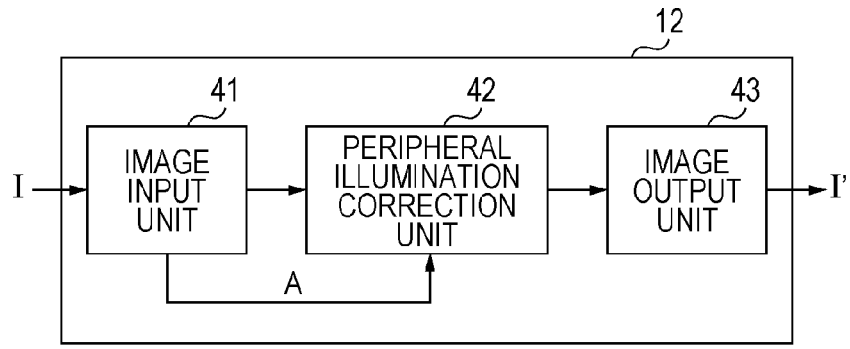
FIGS. 4A to 4C are block diagrams illustrating examples of functional configurations of an image editing apparatus.

FIG. 4A is a functional block diagram illustrating a functional configuration of the image editing apparatus 12. The image editing apparatus 12 includes an image input unit 41, a peripheral illumination correction unit 42, and an image output unit 43.

The image input unit 41 acquires the image data I, to be subjected to an editing process, from the image output unit 24 and outputs a signal corresponding to the image data I to the peripheral illumination correction unit 42. The image input unit 41 acquires lens identification information A described in a header of the image data I by analyzing the image data I, and outputs the acquired lens identification information A to the peripheral illumination correction unit 42.

The peripheral illumination correction unit 42 performs a peripheral illumination correction process on the image data I based on the received lens identification information A, and outputs resultant corrected image data I'.

Referring to FIG. 12, an example of a peripheral illumination correction process is described below. In general, image data obtained through an optical system has a tendency that the illumination gradually decreases with increasing distance of pixels from the center of the image. This phenomenon is known as a peripheral illumination falloff.

The peripheral illumination correction is a process to correct pixel values in a peripheral area of the image data by a greater correction factor than pixel values in a central area. The reduction in illumination is not limited to the peripheral area of image data. Depending on the optical characteristic of the lens, a similar reduction in illumination can occur in areas in image data other than the peripheral area. For the image data having such a reduction in illumination similar to that in the peripheral area, pixel values may be properly corrected according to the optical characteristic of the lens.

In FIGS. 12A and 12B, the distance from the center of an image is expressed along a horizontal axis, while the pixel luminance value is expressed along a vertical axis. In the following description, it is assumed that the luminance of a subject is higher in a peripheral area than a central area, that is, correct pixel values in the peripheral area are higher (brighter) than those in the central area as shown in FIG. 12B. Even in this case, because of the reduction in illumination in the peripheral area, there is a possibility that pixel values of actually produced image data are lower (darker) in an area farther from the center of the image than in an area closer to the center of the image as shown in FIG. 12A.

In the peripheral illumination correction, the correction is performed by a greater factor for pixel values in the peripheral area than for pixel values in the central area so that the pixel values of the raw image data shown in FIG. 12A are converted into the correct pixel values of the image of the subject as shown in FIG. 12B.

More specifically, for example, the peripheral illumination correction process may be performed according to mathematical expression (5) shown below.

$$I'=I/Pr \quad (5)$$

where I' denotes a corrected pixel value, I denotes a pixel value of raw image data, and Pr denotes a reduction ratio of illumination at a radius of r.

The reduction ratio Pr of illumination is defined as the ratio of a pixel value Ip at an arbitrary location to a pixel value Ic at the center of the image, and can be represented as mathematical expression (6) shown below.

$$Pr=(Ip/Ic) \quad (6)$$

Note that Ip and Ic are measured in advance, and Pr is calculated from the measured values of Ip and Ic. Calculated values may be stored in the HD 1516 or the like. The value of Pr varies with r, and thus values of Pr may be stored in the form of a table such as that shown in FIG. 12C.

The values of Pr also depend on a lens used. The values of Pr may be calculated for each lens, and data indicating the values of Pr for each lens may be stored in the HD 1516. A specific set of data of Pr corresponding to a particular lens may be selected based on lens identification information A attached to image data I.

The peripheral illumination correction process is not limited to that described above, but the peripheral illumination correction process may be performed in many ways. For example, in a case where the reduction in illumination occurs not such that the amount of reduction is equal on a circle but such that the amount of reduction is equal on an ellipse, as in the example shown in FIG. 7C, the distance from the center of an image may be calculated for each of image data using the mask information shown in FIG. 17A (that is, the distance defined by the mask information is calculated), and the reduction ratio of illumination for a particular distance may be determined from the table shown in FIG. 17B. The determined reduction ratio of illumination may be applied to mathematical expression (5) thereby achieving the peripheral illumination correction.

After the correction is performed by the peripheral illumination correction unit 42, resultant image data I' is finally output via the image output unit 43. The image output unit 43 stores the image data I' in a storage medium such as removable medium or transmits the image data I' to a particular host device via a wired/wireless network.

In the example described above, the image editing apparatus 12 performs only the peripheral illumination correction process. The image editing apparatus 12 may perform other image editing processes such as a luminance correction in addition to the peripheral illumination correction process.

Figure 4B:
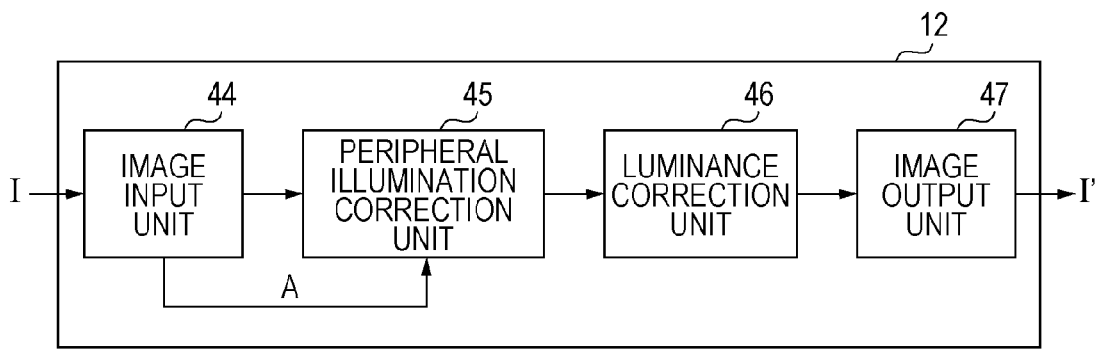

FIG. 4B is a functional block diagram of an image editing apparatus 12 configured to perform the luminance correction process in addition to the peripheral illumination correction process. In FIG. 4B, the image editing apparatus 12 includes an image input unit 44, a peripheral illumination correction unit 45, a luminance correction unit 46, and an image output unit 47. The image input unit 44, the peripheral illumination correction unit 45, and the image output unit 47 are similar in operation and configuration to the image input unit 41, the peripheral illumination correction unit 42, and the image output unit 43 shown in FIG. 4A, and thus a further description thereof is omitted.

The luminance correction unit 46 performs the luminance correction process on the image data output from the peripheral illumination correction unit 45 and outputs the resultant image data. A specific example of the luminance correction process is described below. The luminance correction process includes a gamma correction process, a contrast correction process, etc.

The gamma correction process changes the pixel value of each pixel of image data, for example, according to mathematical expression (7) shown below.

$$Y'=Y'M \times (Y/YM)^{(1/\gamma)} \quad (7)$$

where Y denotes an original luminance value of a pixel, Y' denotes a luminance value of the pixel obtained after the gamma correction is performed, YM denotes a maximum value of luminance values before the gamma correction is performed, Y'M denotes a maximum value of luminance values after the gamma correction is performed, and γ denotes a gamma correction value for a particular luminance value.

Figure 13A:
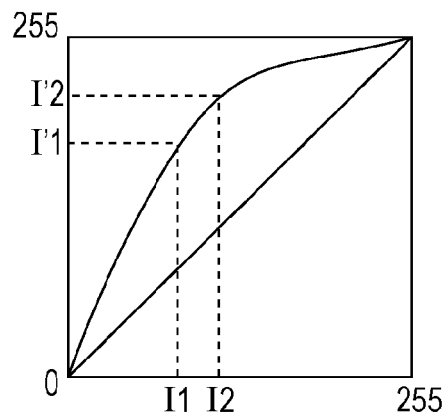
FIGS. 13A and 13B are diagrams illustrating a gamma correction process and a contrast correction process.

Referring to FIG. 13A, the gamma correction process according to mathematical expression (7) is described in further detail below. In FIG. 13A, a horizontal axis represents the luminance value before the gamma correction is performed, and a vertical axis represents the luminance value after the gamma correction is performed. The luminance value is corrected according to a gamma curve (shown in FIG. 13A) determined by the value of γ in mathematical expression (7). That is, when the value of γ is greater than 1, the luminance value is converted into a lower (darker) value. When the value of γ is smaller than 1, the luminance value is converted into a higher (brighter) value. In FIG. 13A, for example, when the luminance value is a value C(I1) before the gamma correction is performed, the luminance value is converted into a value C(I'1) by the gamma correction. On the other hand, a value C(I2) is converted into a value C(I'2).

Figure 13B:
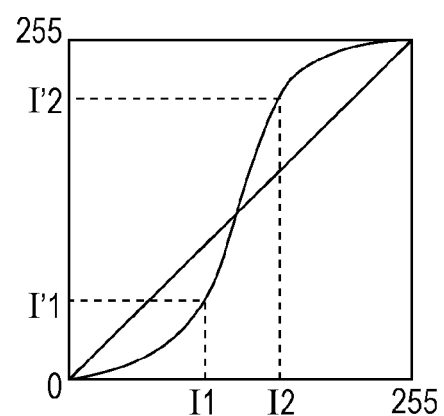

Referring to FIG. 13B, the contrast correction process is described below. In the contrast correction process according to the present embodiment, the luminance of each pixel of image data is changed using a correction curve such as that shown in FIG. 13B. Via the contrast correction process, dark color components are converted to be further darker, while bright color components are converted to be further brighter. In FIG. 13B, for example, when the luminance value has a value of C(I1) before the contrast correction is performed, the value is converted into value C(I"1) via the contrast correction, while a value of C(I2) is converted into C(I"2).

A combination of the gamma correction process and the contrast correction process described above may be performed as the luminance correction process. Alternatively, one of the gamma correction process and the contrast correction process may be performed as the luminance correction process.

In the present embodiment, pixel pairs are selected so as to satisfy the condition in S66 in FIG. 6A. Therefore, even when the peripheral illumination correction is performed in the image editing apparatus, the relationship as to which one of the two pixels in each selected pair is greater (or smaller) is preserved via the peripheral illumination correction performed in the image editing apparatus. Furthermore, the relationship as to which one of the two pixels in the pair is greater (or smaller) is also preserved via the luminance correction described above. Therefore, in the present embodiment of the invention, even when the luminance correction is performed in the image editing apparatus in addition to the peripheral illumination correction, the relationship as to which one of the two pixels in each selected pair is greater (or smaller) is preserved via the process performed in the image editing apparatus.

Figure 5:
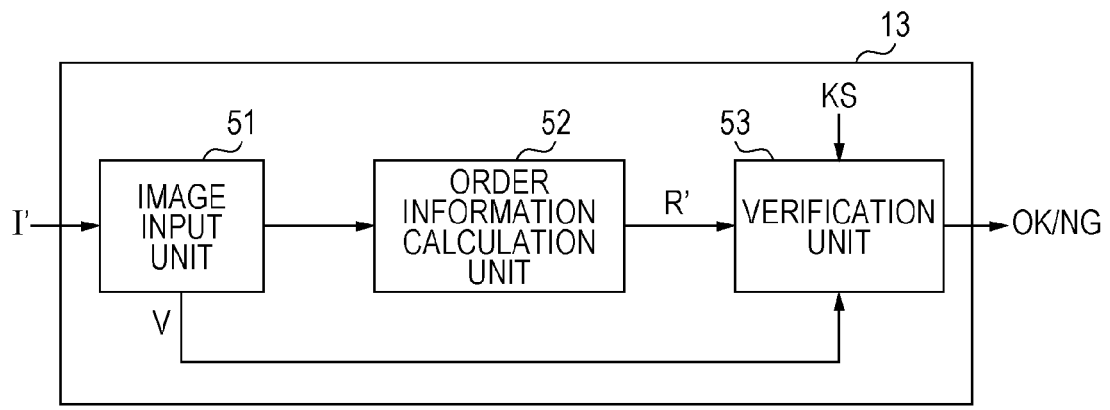
FIG. 5 is a block diagram illustrating a functional configuration of an image verification apparatus.

FIG. 5 is a functional block diagram illustrating a functional configuration of the image verification apparatus 13. In the following description, it is assumed that electric power to the host computer 1511 has already been turned on and the OS has already been loaded into the work memory 1515. The image verification apparatus 13 includes an image input unit 51, an order information calculation unit 52, and a verification unit 53. Note that an image verification process described below may be performed by software. In this case, the units described above are realized in the form of program modules.

In FIG. 5, the image input unit 51 acquires image data I' edited by the image editing apparatus 12 and analyzes a header of the acquired image data I' to extract verification data V attached thereto. The image input unit 51 outputs the extracted verification data V to the order information calculation unit 52.

The order information calculation unit 52 produces order information R' from the image data I' supplied from the image input unit 51 and outputs the resultant order information R' to the verification unit 53. The order information calculation process performed in the order information calculation unit 52 is similar to the order information calculation process performed in the order information calculation unit 22 described above with reference to FIG. 2A, and thus a further description thereof is omitted.

If the verification unit 53 acquires the order information R' produced by the order information calculation unit 52 and the verification data V extracted by the image input unit 51, the verification unit 53 verifies whether the image data I' has not been tampered with. The verification unit 53 outputs a verification result ("OK" when the image data I' has not been tampered with but otherwise "NG"). The details of the verification process performed by the verification unit 53 will be described later.

FIG. 9A is a flow chart illustrating an image verification process performed by the image verification apparatus 13. First, in step S91, the image input unit 51 acquires image data I'. In step S92, the pseudo-random number generation unit 31 generates a pseudo-random number RND. In step S93, the reference pixel selection unit 32 selects a reference pixel using the generated pseudo-random number RND.

Next, in step S94, the reference pixel selection unit 32 determines whether the selected reference pixel satisfies the condition defined by the mathematical expression (3). In a case where it is determined in step S94 that the condition expressed in (3) is satisfied, the process proceeds to step S93 to select another reference pixel. In step S93, the reference pixel selection unit 32 selects a new reference pixel 11 using a new pseudo-random number. In a case where it is determined in step S94 that the condition expressed in (3) is not satisfied, the process proceeds to step S95.

In step S95, the comparison pixel selection unit 33 selects a comparison pixel based on a generated pseudo-random number RND. In step S96, the determination unit 34 determines whether the reference pixel and the comparison pixel satisfy the condition defined by the mathematical expression (4) described above. In a case where it is determined in step S96 that the condition expressed in (4) is satisfied, the process proceeds to step S97. However, if it is determined that the condition expressed in (4) is not satisfied, the process proceeds to step S95. In step S97, the pixel value comparing unit 35 produces order information R'k from the reference pixel and the comparison pixel according to mathematical expression (2).

In step S98, the pixel value comparing unit 35 determines whether a predetermined number of pixel pairs have been selected. If it is determined in step S98 that the predetermined number of pixel pairs have been selected, the process proceeds to step S99, but otherwise the processing flow returns to step S93 to repeat the process from step S93.

In step S99, the verification unit 53 performs verification by comparing the verification data R' calculated by the order information calculation unit 52 with the verification data V extracted by the image input unit 51, and the verification unit 53 outputs a verification result.

FIGS. 11A to 11D are flow charts illustrating examples of the verification process performed in step S99.

Figure 11A:
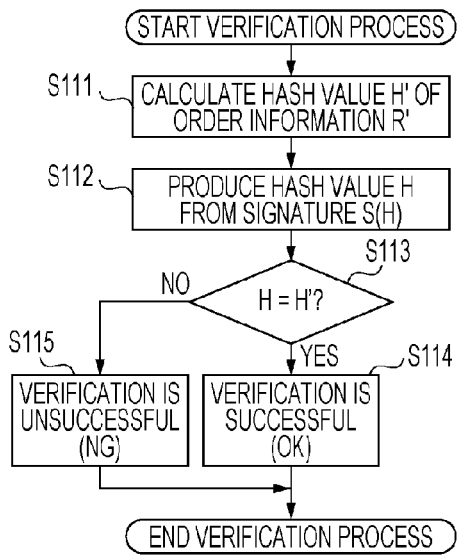
FIGS. 11A to 11D are flow charts illustrating examples of a verification process.

FIG. 11A is a flow chart illustrating a process in which an electronic signature is used as the verification data. In this case, first, in step S111, the verification unit 53 calculates a hash value H' by inputting given order information R' into a hash function. In step S112, the verification unit 53 calculates a hash value H from the electronic signature S(H) (verification data V).

In step S113, the verification unit 53 compares the hash value H' with the hash value H. In a case where it is determined in step S113 that the hash value H' is equal to the hash value H, the process proceeds to step S114 in which it is determined that the verification has been passed successfully, but otherwise the process proceeds to step S115 in which it is determined that the verification has failed.

Note that the hash function and the electronic signature algorithm used in step S111 and step S112 are similar to the hash function and the electronic signature algorithm used in step S81 and step S82.

Figure 11B:
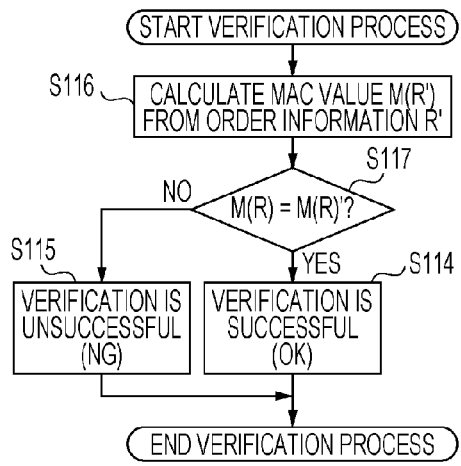

FIG. 11B is a flow chart illustrating a process in which MAC is used as the verification data. In this case, first, in step S116, the verification unit 53 calculates a MAC value M(R') from given order information R'.

In step S117, the verification unit 53 compares the MAC value M(R') with the MAC value M(R) (verification data V). In a case where it is determined in step S117 that the MAC value M(R') is equal to the MAC value M(R), the process proceeds to step S114 in which it is determined that the verification has been passed successfully, but otherwise the process proceeds to step S115 in which it is determined that the verification has failed.

Note that the MAC calculation algorithm used in step S116 is similar to the MAC calculation algorithm used in step S85.

Figure 11C:
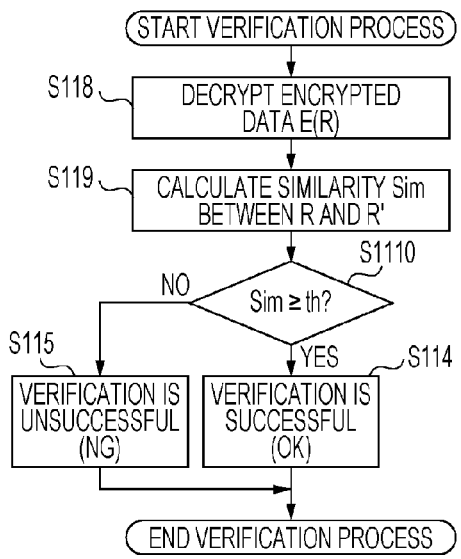
Figure 11D:
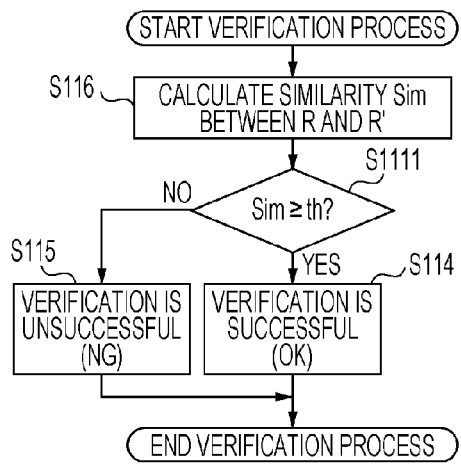

FIG. 11C is a flow chart illustrating a process in which encrypted order information is used as the verification data. In this case, first, in step S118, the verification unit 53 decrypts the encrypted data E(R) (verification data V) into the order information R. In step S119, the verification unit 53 calculates the similarity between the decrypted order information R and the order information R'. Because the order information R and order information R' produced according to mathematical expression (1) are used in step S119, the similarity is represented by a Hamming distance between the order information R and the order information R'.

In step S1110, the verification unit 53 determines whether the calculated similarity is greater than or equal to a threshold value. Note that when two different bit sequences are given, the Hamming distance between these two bit sequences is defined by the number of different bits located at corresponding positions. Therefore, the Hamming distance decreases with increasing similarity. That is, when the Hamming distance is smaller than or equal to a threshold value, the similarity is higher than or equal to a threshold value.

In a case where it is determined in step S1110 that the similarity is greater than or equal to the threshold value, the process proceeds to step S114 in which it is determined that the verification has been passed successfully. However, if the similarity is lower than the threshold value, the process proceeds to step S115 in which it is determined that the verification has failed. Note that the threshold value used in the determination of the similarity in step S1110 may be stored in advance in the RAM 1515 or the HD 1516 in the image verification apparatus 13. Alternatively, the threshold value used in step S1110 may be set to a value input by a user of the image verification apparatus 13 via the pointing device 1522 or the keyboard 1523. The method of determining the similarity is not limited to that using the Hamming distance, but other methods may be used such as a method using a cross-correlation function of the order information R and the order information R', a method using DP matching, etc.

FIG. 8D is a flow chart illustrating an example of a process in which the order information R itself is used as the verification data. In this case, first, in step S119, the verification unit 53 calculates the similarity Sim between the order information R and the order information R'.

In step S1111, the verification unit 53 determines whether the calculated similarity Sim is greater than or equal to a threshold value. In a case where it is determined in step S1111 that the similarity Sim is greater than or equal to the threshold value, the process proceeds to step S114 in which it is determined that the verification has been passed successfully, but otherwise the process proceeds to step S115 in which it is determined that the verification has failed. In the case where the order information is directly used as the verification data V, if an attacker, who has tampered with the image data I', succeeds in producing new order information R from the changed image data, the image verification apparatus 13 will determine that the image data I' has not been tampered with although it actually has been tampered with.

In the present embodiment, to avoid the above problem, only the image input apparatus 11 is capable of producing the order information R. For this purpose, in the present embodiment, the initial value of the random number KR is shared by the image input apparatus 11 and the image verification apparatus 13 in a secure manner. This prevents the attacker from selecting a correct pixel pair. Thus, the attacker cannot produce correct order information R and thus the attacker cannot produce correct order information from image data that has been tampered with.

Note that the "secure manner" denotes a manner in which data is kept secret and the data cannot be changed.

Next, a reason is described below why the image verification apparatus 13 can correctly verify that image data is original even in the case where after the image data is generated by the image input apparatus 11, the peripheral illumination correction is performed on the image data by the image editing apparatus 12.

FIG. 12D illustrates examples of pixel pairs selected in the image input apparatus 11. In the present embodiment of the invention, only pixel pairs that satisfy the particular condition are selected in step S66 as described above. In FIG. 12D, reference numeral 125 denotes the center of an image. In the specific example shown in FIG. 12D, a pixel 121 is selected as a reference pixel 11, and pixels 122, 123, and 124 are selected as comparison pixels 12. The distance of the comparison pixel 122 from the center of the image is greater than the distance of the reference pixel 121 from the center of the image (i.e., R1<R2), and thus the comparison pixel 122 is selected in step S66 only when luminance values satisfy the condition $C(I1) < C(I2)$.

On the other hand, the distance of the comparison pixel 123 from the center of the image is smaller than the distance of the reference pixel 121 from the center of the image (i.e., R1>R2), and thus the comparison pixel 123 is selected in step S66 only when luminance values satisfy the condition $C(I1) > C(I2)$. The comparison pixel 124 and the reference pixel 121 are located on the same concentric circle centered at the center of the image (i.e., R1=R2), and thus the comparison pixel 124 is selected regardless of the luminance values of the comparison pixel 124 and the reference pixel 121. In any case, each pixel pair is selected such that a pixel located farther from the center of the image has a higher luminance value than the other pixel located closer to the center of the image.

Next, a discussion is given below as to the peripheral illumination correction performed by the image editing apparatus 12 for the pixel pairs selected in the above-described manner. As described above with reference to FIGS. 12A and 12B, even when a pixel in a peripheral area of an image has a smaller pixel value than a pixel in a central area of the image before the peripheral illumination correction is performed (i.e., $C(I1)>C(I2)$), the peripheral illumination correction can cause the relative pixel values to be inverted (i.e., $C(I'1)<C(I'2)$).

In the present embodiment, in view of the above, pixel pairs are selected only when a pixel located farther from the center of an image has a higher luminance value than the other pixel located closer to the center of the image so that the order of relative magnitudes of two pixel values of each pixel pair is preserved via the peripheral illumination correction.

A further discussion is given below as to the luminance correction performed in addition to the peripheral illumination correction by the image editing apparatus 12. Also in this case, the order of relative magnitudes of two pixel values of each pixel pair is preserved although luminance values of pixels can change via the luminance correction.

Furthermore, in the present embodiment, step S64 is performed to make a determination according to mathematical expression (3) as to whether a selected reference pixel is located in a peripheral area of image data (R1>Rth) and a selected reference pixel has a smaller pixel value than a threshold value associated with the pixel value of the reference pixel (C(I1)<Cth). If the determination in step S64 is affirmative, another reference pixel is selected, because when the reference pixel satisfies the condition represented by mathematical expression (3), it is difficult to satisfy the condition represented by mathematical expression (4). In the present embodiment, step S64 is performed to prevent a pixel satisfying the condition (3) from being selected as a reference pixel, so that it becomes possible to select a comparison pixel satisfying the condition (4) for any selected reference pixel. In the present embodiment, as described above, when a reference pixel is selected, the selected reference pixel is evaluated in step S64 as to whether the selected reference pixel is difficult to satisfy the condition (4) thereby making it possible to perform the process in an efficient manner. However, the process of the present embodiment of the invention may be performed differently. For example, the determination in step S64 may not be performed. In this case, after a reference pixel is selected in step S63, the processing flow directly proceeds to step S65 to select a comparison pixel. If the reference pixel selected in step S63 does not satisfy the condition (3) and thus the condition (4) is not satisfied in step S66, then the processing flow returns to step S65 to select another comparison pixel. In the case where step S64 in FIG. 6A is not performed, corresponding step S94 in FIG. 9A is not performed.

In the present embodiment, when the condition (4) is not satisfied in step S66, the processing flow returns to step S65 to reselect a comparison pixel. Alternatively, the processing flow may return to step S63 to reselect a reference pixel. In this case, if the condition (4) is not satisfied in corresponding step S95 in FIG. 9, the processing flow may return to step S93 to reselect a reference pixel.

In the present embodiment, as described above, verification data is produced based on pixel pairs selected so that the order of relative magnitudes of pixel values is preserved via the peripheral illumination correction and the luminance correction.

Based on the verification data described above, verification is performed as to whether image data has not been tampered with.

Thus it is possible to assure that image data is original even in a case where the image data is subjected to peripheral illumination correction or luminance correction after the image data is produced.

Second Embodiment

In the first embodiment described above, the image editing process including the peripheral illumination correction is performed in the image editing apparatus 12. The peripheral illumination correction is performed such that pixel values in a peripheral area are changed by greater factors than pixel values in a central area. That is, the peripheral illumination correction is an example of image processing in which the correction factor varies depending on locations of pixels in image data. In view of the above, embodiments of the invention may be applied to not only the peripheral illumination correction but many other types of image processing in which the correction factor varies depending on locations of pixels in image data.

An example of a correction process other than the peripheral illumination correction is a partial luminance correction described below.

Figure 2B:
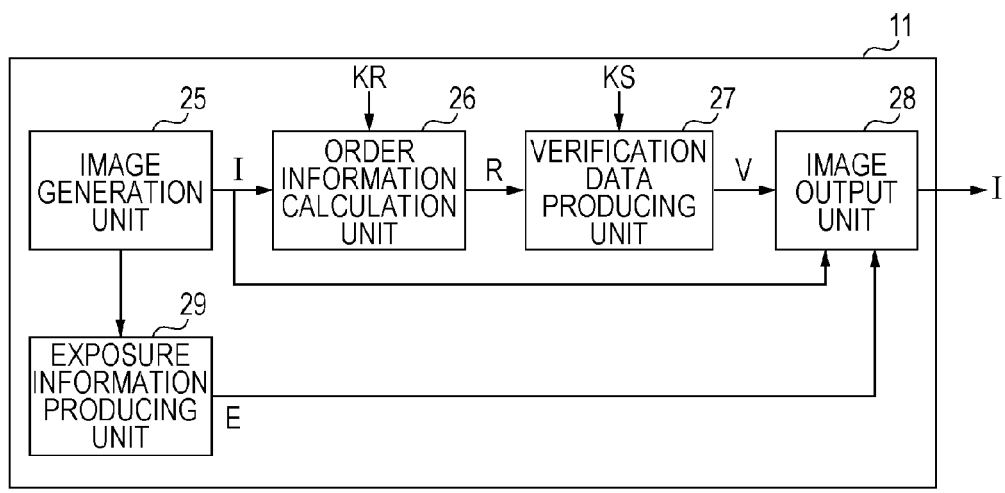

FIG. 2B is a block diagram illustrating a functional configuration of an image input apparatus 11 according to the present embodiment of the invention. In the present embodiment, the image input apparatus 11 includes an image generation unit 25, an order information calculation unit 26, a verification data producing unit 27, an image output unit 28, and an exposure information generation unit 29. The image generation unit 25, the order information calculation unit 26, the verification data producing unit 27, and the image output unit 28 are similar in configuration to the image generation unit 21, the order information calculation unit 22, the verification data producing unit 23, and the image output unit 24 and thus a further description thereof is omitted.

The exposure information generation unit 29 is described below. The exposure information generation unit 29 is configured to produce exposure information based on data on exposure measured by the image generation unit 25 and outputs resultant exposure information E.

The exposure information E output from the exposure information generation unit 29 is attached to image data I and output from the image output unit 28. Note that the exposure information E is information representing whether each area of the image data is underexposed or well exposed.

Next, referring to FIGS. 14A to 14E, a method of producing the exposure information E is described below. In a case where an image of a scene such as that shown in FIG. 14A is to be taken, the image is divided into a plurality of areas as shown in FIG. 14B and photometry is performed for each area. Next, as shown in FIG. 14C, areas determined as being well exposed are assigned "0", while 1" is assigned to areas determined as being underexposed. Resultant information shown in FIG. 14C is then output as exposure information E. The areas determined to be well exposed (the areas identified by the exposure information E as "0") are each referred to as an "area A", and the areas determined to be underexposed (the areas identified by the exposure information E as "1") are each referred to as an "area B".

The exposure information may be produced using one of many known methods as long as exposure information can be produced for each area.

In the present embodiment, it is assumed that the exposure information assigned to an area indicates whether the area is well exposed or underexposed. However, the exposure information may include information indicating that an area is overexposed. More specifically, for example, the area determined as being overexposed is assigned "−1" as the exposure information E. In this case, the area determined as being overexposed is referred to as an "area C".

Figure 6B:
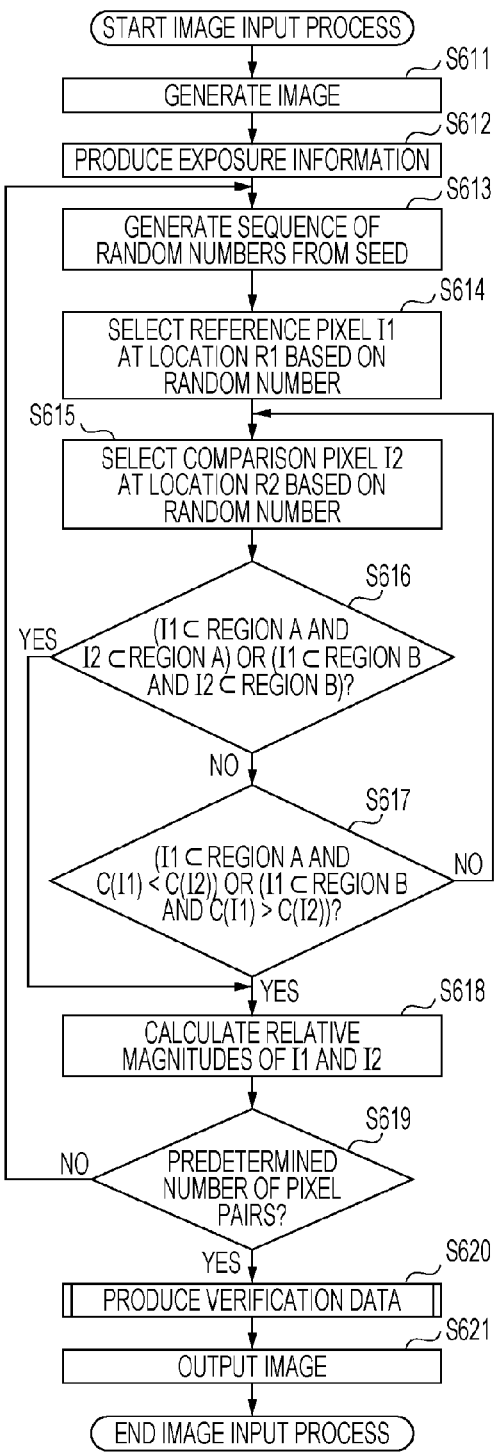

FIG. 6B is a flow chart illustrating an image input process performed in the image input apparatus 11. First, in step S611, the image generation unit 25 generates image data I. In step S612, the exposure information generation unit 29 generates exposure information E. In step S613, the pseudo-random number generation unit 31 generates a pseudo-random number RND.

In step S614, the reference pixel selection unit 32 selects a reference pixel using the generated pseudo-random number RND.

In step S615, the comparison pixel selection unit 33 selects a comparison pixel based on a generated pseudo-random number RND.

In step S616, the determination unit 34 determines whether the selected reference pixel and the comparison pixel satisfy the condition defined by the mathematical expression (8).

$$(I1 \subset \text{area A and } I2 \subset \text{area A})$$

or $$(I1 \subset \text{area B and } I2 \subset \text{area B}) \qquad (8)$$

where I1 denotes the pixel location of the reference pixel, and I2 denotes the pixel location of the comparison pixel. The determination as to whether I1 ⊂ area A or I2 ⊂ area A is made by determining whether the exposure information E indicates "0". The determination as to whether I1 ⊂ area B or I2 ⊂ area B is made by determining whether the exposure information E indicates "1".

In the case where the exposure information E includes information indicating overexposure, the determination in step S616 is made as to condition (8') shown below instead of condition (8).

$$(I1 \subset \text{area A and } I2 \subset \text{area A})$$

or $$(I1 \subset \text{area B and } I2 \subset \text{area B})$$

or $$(I1 \subset \text{area C and } I2 \subset \text{area C}) \qquad (8')$$

In any case, the determination as to whether the pixel location I1 of the reference pixel and the pixel location I2 of the comparison pixel are both in the same area is made according to condition (8) or (8').

In a case where it is determined in step S616 that the condition expressed in (8) or (8') is satisfied, the process proceeds to step S618, which will be described later. On the other hand, in a case where the condition defined by (8) or the condition defined by (8') is not satisfied, the process proceeds to step S617.

In step S617, the determination unit 34 determines whether the selected reference pixel and the comparison pixel satisfy condition (9) shown below.

$$(I1 \subset \text{area } A \text{ and } C(I1) \leq C(I2))$$

or $$(I1 \subset \text{area } B \text{ and } C(I1) > C(I2)) \qquad (9)$$

where C(x) denotes a pixel value at a pixel location x, I1 denotes the pixel location of the reference pixel, and I2 denotes the pixel location of the comparison pixel. The determination as to whether I1 ⊂ area A is made by determining whether the exposure information E indicates "0", and The determination as to whether I1 ⊂ area B is made by determining whether the exposure information E indicates "1".

In the case where the exposure information E includes information associated with overexposure, the determination in step S617 is made as to whether condition (9') shown below is satisfied instead of determining whether condition (9) is satisfied.

$$(I1 \subset \text{area } A \text{ and } I2 \subset \text{area } B) \text{ and } C(I1) \leq C(I2))$$

or $$(I1 \subset \text{area } C \text{ and } I2 \subset \text{area } A) \text{ and } C(I1) \leq C(I2))$$

or $$(I1 \subset \text{area } C \text{ and } I2 \subset \text{area } B) \text{ and } C(I1) \leq C(I2))$$

or $$(I1 \subset \text{area } B \text{ and } I2 \subset \text{area } A) \text{ and } C(I1) > C(I2))$$

or $$(I1 \subset \text{area } A \text{ and } I2 \subset \text{area } C) \text{ and } C(I1) > C(I2))$$

or $$(I1 \subset \text{area } B \text{ and } I2 \subset \text{area } C) \text{ and } C(I1) > C(I2)) \qquad (9')$$

In a case where it is determined in step S617 that the condition expressed in (9) or (9') is satisfied, the process proceeds to step S618. In step S618, the pixel value comparing unit 35 produces order information Rk from the reference pixel and the comparison pixel according to mathematical expression (2) described above.

Note that by selecting pixel pairs such that the condition (9) or (9') is satisfied, it becomes possible to assure that pixels in an area corrected to be brighter (areas B are corrected to be brighter than areas A, areas A are corrected to be brighter than areas C, and areas B are corrected to be brighter than areas C) have greater pixel values than pixels in the other areas. Next, in step S619, the pixel value comparing unit 35 determines whether a predetermined number of pixel pairs have been selected. If it is determined in step S619 that the predetermined number of pixel pairs have been selected, the process proceeds to step S620, but otherwise the processing flow returns to step S614 to perform the process again from step S614.

In step S620, the verification data producing unit 27 produces verification data V from the order information R produced. In step S621, the image output unit 28 outputs the image data with the verification data V added thereto.

In the present embodiment, the process of producing verification data is similar to the process according to the first embodiment, and thus a further description thereof is omitted.

Figure 4C:
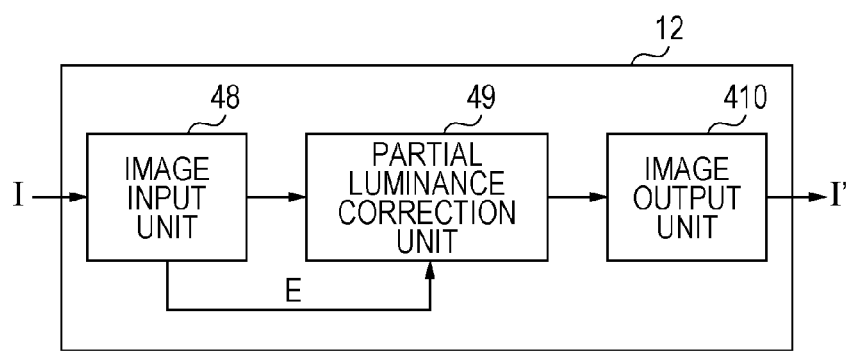

FIG. 4C is a block diagram illustrating a functional configuration of the image editing apparatus 12 according to the present embodiment of the invention. The image editing apparatus 12 includes an image input unit 48, a partial luminance correction unit 49, and image output unit 410. The image input unit 48 and the image output unit 410 are similar to the image input unit 41 and the image output unit 43, and thus a further description thereof is omitted.

The partial luminance correction unit 49 performs a partial luminance correction on the image data I using the exposure information E supplied from the image input unit 48, and outputs resultant correction image data.

In the partial luminance correction process according to the present embodiment, a determination is made as to whether each pixel is located in an underexposed area (area B) or a well exposed area (area A). A gamma value is set such that pixels in the underexposed areas have a gamma value γ2 greater than a gamma value γ1 assigned to pixels in the well exposed areas, and a gamma correction process is performed using the gamma values assigned to each pixel.

Pixel values of pixels assigned greater gamma values are increased (corrected to be brighter) by greater factors, and thus underexposure, in particular extreme underexposure, is improved via the partial luminance correction process.

Note that the specific method of the partial luminance correction process is not limited to that described above, but many other methods may be employed as long as the correction is performed by greater factors for luminance values in underexposed areas than for luminance values in well exposed areas.

FIG. 9B is a flow chart illustrating an image verification process performed by an image verification apparatus according to an embodiment of the invention. The image verification apparatus used in the present embodiment is similar in functional configuration to the image verification apparatus 13, and thus like parts are denoted by like reference numerals and a further description thereof is omitted.

First, in step S910, the image input unit 51 acquires image data I. In step S911, the pseudo-random number generation unit 31 generates a pseudo-random number RND.

In step S912, the reference pixel selection unit 32 selects a reference pixel using the generated pseudo-random number RND. In step S913, the comparison pixel selection unit 33 selects a comparison pixel based on a generated pseudo-random number RND.

Next, in step S914, the determination unit 34 determines whether the selected reference pixel and the comparison pixel satisfy the condition defined by the mathematical expression (8). In a case where it is determined in step S914 that the condition expressed in (8) is satisfied, the process proceeds to step S916. On the other hand, in a case where the condition expressed in (8) is not satisfied, the process proceeds to step S914.

In step S915, the determination unit 34 determines whether the selected reference pixel and the comparison pixel satisfy the condition defined by the mathematical expression (9). In a case where it is determined in step S915 that the condition expressed in (9) is satisfied, the process proceeds to step S916. On the other hand, in a case where the condition expressed in (9) is not satisfied, the process proceeds to step S913.

In step S916, the pixel value comparing unit 35 produces order information R'k from the reference pixel and the comparison pixel according to mathematical expression (2). Next, in step S917, the pixel value comparing unit 35 determines whether a predetermined number of pixel pairs have been selected. If it is determined in step S917 that the predetermined number of pixel pairs have been selected, the process proceeds to step S918, but otherwise the processing flow returns to step S912 to repeat the process from step S912.

In step S918, the verification unit 53 performs verification using the verification data R' calculated by the order information calculation unit 52 and the verification data V extracted by the image input unit 51, and output a verification result.

In the present embodiment, the verification process is similar to that according to the first embodiment, and thus a further description thereof is omitted.

The present embodiment makes it possible for the image verification apparatus 13 to verify whether given image data is original even for the case where the image data generated by the image input apparatus 11 is subjected to the partial luminance correction in the image editing apparatus 12 as described below.

FIGS. 14D and 14E illustrate examples of pixel pairs selected in the image input apparatus 11. As described above, via the determinations in step S616 and step S617 in FIG. 6B, pixel pairs are selected such that the particular conditions are satisfied. For example, as shown in FIG. 14D, a pixel 141 (in the area A) is selected as a reference pixel I1 and a pixel 142 (in the area A) and a pixel 143 (in the area B) are selected as comparison pixels I2. In this case, the comparison pixel 142 is located in the same area A as the area in which the reference pixel 141 is located (I1 ⊂ area A and I2 ⊂ area A), and thus this pixel pair is selected in step S616 regardless of the luminance value. On the other hand, the comparison pixel 143 is located in the area B that is different from the area in which the reference pixel 142 is located, and thus the comparison pixel 143 is selected only when the determination in step S617 in terms of the luminance value is made that C(I1)<C(I2).

On the other hand, in a case where a pixel 144 (in the area B) is selected as a reference pixel I1 and a pixel 145 (in the area A) and a pixel 146 (in the area B) are selected as comparison pixels I2 as shown in FIG. 14E, the comparison pixel 146 is located in the same area B as that in which the reference pixel 144 is located (I1 ⊂ area B and I2 ⊂ area B), and thus this pixel pair is selected in step S616 regardless of the luminance value. On the other hand, the comparison pixel 145 is located in the area A that is different from the area in which the reference pixel 144 is located, and thus the comparison pixel 145 is selected in step S617 only when luminance values satisfy the condition C(I1)>C(I2).

Next, a discussion is made below for a case where the pixel pairs selected in the above-described manner are subjected to the partial luminance correction performed in the image editing apparatus 12. In the partial luminance correction, the gamma value γ2 for the underexposure area B is greater than the gamma value γ1 for the area A in which exposure is correct. Therefore, when pixels in a pair are located in areas with different attributes, there is a possibility that the partial luminance correction causes the order of magnitudes of pixel values to be inverted.

However in the present embodiment, pixel pairs are selected such that a pixel located in the area B has a greater pixel value than a pixel located in the area A has. This ensures that the order of magnitudes of pixel values of each pair is preserved via the partial luminance correction.

In the present embodiment, as described above, verification data is produced from pixel pairs that are selected such that the order of relative magnitude of pixel values is preserved via the partial luminance correction, and verification as to whether image data has not been tampered with is performed based on the verification data produced in the above-described manner.

Therefore, the present embodiment makes it possible to assure that image data is original even for a case where the image data is subjected to the partial luminance correction after the image data is produced.

In the present embodiment, when it is determined in step S618 that the condition (9) is not satisfied, the processing flow returns to step S616 to reselect a comparison pixel. Alternatively, the processing flow may return to step S614 to reselect a reference pixel. In this case, if the condition (9) is not satisfied in corresponding step S915 in FIG. 9, the processing flow may return to step S912 to reselect a reference pixel.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-253074 filed Nov. 4, 2009 and No. 2010-230649 filed Oct. 13, 2010, which are hereby incorporated by reference herein in their entirety.

What is claimed is:

1. An apparatus comprising:
a processor; and
a memory coupled to the processor storing instructions that, when executed by the processor, cause the processor to perform operations comprising:
selecting a pixel set including a first pixel and a second pixel based on pixel values and information on an image space of image data of a captured image;
generating order information of the selected pixel set, wherein the order information includes at least information indicating a magnitude relationship between the first pixel and the second pixel;
generating, verification data, by selecting the first pixel and the second pixel so that the order information is preserved via the change in the magnitude relationship; and
outputting the image data and the verification data,
wherein the selecting selects the first pixel and the second pixel where a distance between the first pixel and a center of a lens is greater than a distance between the second pixel and the center of the lens and a value of the first pixel is greater than a value of the second pixel.

2. The apparatus according to claim 1, wherein:
the selecting selects a block pair based on an average pixel value of a block and a distance between a reference location and a predetermined location in a block; and
the generating of order information comprises calculating the order of magnitude between average pixel values of blocks in the selected block pairs.

3. The apparatus according to claim 1, wherein the selecting selects a pixel pair according to pixel values of pixels and according to whether the pixels are located in an underexposed area, an overexposed area, or a well exposed area in the image data.

4. The apparatus according to claim 1, further comprising a determination unit configured to determine whether a distance of the first pixel from a center of the image is longer than a distance of the second pixel from the center of the image and a value of the first pixel is greater than a value of the second pixel,
wherein the selecting selects the pixel set including the first pixel and the second pixel, in a case where the determination unit determines that the distance of the first pixel from the center of the image is longer than the distance of the second pixel from the center of the image and the value of the first pixel is greater than the value of the second pixel.

5. The apparatus according to claim 4,
wherein the determination unit selects a first pixel block and a second pixel block from the image, and determines whether a distance between a predetermined position of the first pixel block and a center of the image is longer than a distance between a predetermined position of the second pixel block and the center of the image and an average value of the first pixel block is greater than an average value of the second pixel block, and
wherein the selecting selects a pixel set including the first pixel block and the second pixel block, in a case where the determination unit determines that the distance between the predetermined position of the first pixel block and the center of the image is longer than the distance between the predetermined position of the second pixel block and the center of the image and the average value of the first pixel block is greater than the average value of the second pixel block.

6. The apparatus according to claim 1,
wherein the selecting selects a plurality of pixel sets, and
wherein the generating of order information comprises generating the order information for the plurality of pixel sets.

7. The apparatus according to claim 1,
wherein the generating of verification data comprises generating, using the order information and encryption technology, verification data which is usable in verification when a process by which the magnitude relationship between the first pixel and the second pixel is changed is performed on the image data.

8. The apparatus according to claim 1, wherein the verification data is signature data or an MAC value.

9. The apparatus according to claim 1, wherein the selecting selects the first pixel and the second pixel regardless of the value of the first pixel and the value of the second pixel, in a case where the distance between the first pixel and the center of the lens is equal to the distance between the second pixel and the center of the lens.

10. The apparatus according to claim 1, wherein the selecting selects the first pixel and the second pixel such that (1) the distance between the first pixel and the center of the lens is greater than the distance between the second pixel and the center of the lens and the value of the first pixel is greater than the value of the second pixel or (2) the distance between the first pixel and the center of the lens is equal to the distance between the second pixel and the center of the lens.

11. An apparatus comprising:
a processor; and
a memory coupled to the processor storing instructions that, when executed by the processor, cause the processor to perform operations comprising:
acquiring image data and first verification data;
selecting a pixel set including a first pixel and a second pixel based on pixel values and information on an image space of the image data;
generating order information of the selected pixel set, wherein the order information includes at least information indicating a magnitude relationship between the first pixel and the second pixel;
generating second verification data, based on the order information;
comparing the first verification data with the second verification data; and
determining, based on a result of the comparison performed by the comparison unit, whether a process by which the magnitude relationship between the first pixel and the second pixel is changed is performed,
wherein the first verification data is usable in verification when the process is performed on the image data, and the first verification data is generated using the order information including the information indicating the magnitude relationship between the first pixel and the second pixel, and
wherein the selecting selects the first pixel and the second pixel where a distance between the first pixel and a center of a lens is greater than a distance between the second pixel and the center of the lens and a value of the first pixel is greater than a value of the second pixel.

12. The apparatus according to claim 11, wherein in a case where the first verification data is equal to the second verification data, it is determined that the image data has not been tampered with, while in a case where the first verification data is not equal to the second verification data, it is determined that the image data has been tampered with.

13. The apparatus according to claim 11, further comprising a determination unit configured to determine whether a distance of the first pixel from a center of the image is longer than a distance of the second pixel from the center of the image and a value of the first pixel is greater than a value of the second pixel,
wherein the selecting selects the pixel set including the first pixel and the second pixel, in a case where the determination unit determines that the distance of the first pixel from the center of the image is longer than the distance of the second pixel from the center of the image and the value of the first pixel is greater than the value of the second pixel.

14. The apparatus according to claim 13,
wherein the determination unit selects a first pixel block and a second pixel block from the image, and determines whether a distance between a predetermined position of the first pixel block and a center of the image is longer than a distance between a predetermined position of the second pixel block and the center of the image and an average value of the first pixel block is greater than an average value of the second pixel block, and
wherein the selection unit selects a pixel set including the first pixel block and the second pixel block, in a case where the determination unit determines that the distance between the predetermined position of the first pixel block and the center of the image is longer than the distance between the predetermined position of the second pixel block and the center of the image and the average value of the first pixel block is greater than the average value of the second pixel block.

15. The apparatus according to claim 11, wherein the selecting selects the first pixel and the second pixel regardless of the value of the first pixel and the value of the second pixel, in a case where the distance between the first pixel and the center of the lens is equal to the distance between the second pixel and the center of the lens.

16. The apparatus according to claim 11, wherein the selecting selects the first pixel and the second pixel such that (1) the distance between the first pixel and the center of the lens is greater than the distance between the second pixel and the reference position center of the lens and the value of the first pixel is greater than the value of the second pixel or (2) the distance between the first pixel and the center of the lens is equal to the distance between the second pixel and the center of the lens.

17. A method comprising:
selecting a pixel set including a first pixel and a second pixel based on pixel values and information on an image space of image data of a captured image;
generating order information of the selected pixel set, wherein the order information includes at least information indicating a magnitude relationship between the first pixel and the second pixel;
generating, verification data, by selecting the first pixel and the second pixel so that the order information is preserved via the change in the magnitude relationship; and
outputting the image data and the verification data,
wherein the selecting selects the first pixel and the second pixel where a distance between the first pixel and a center of a lens is greater than a distance between the second pixel and the center of the lens and a value of the first pixel is greater than a value of the second pixel.

18. The method according to claim 17, wherein:
the selecting is performed so as to select a block pair based on an average pixel value of a block and a distance between a reference location and a predetermined location in a block; and
the generating of order information comprises calculating the order of magnitude between average pixel values of blocks in the selected block pairs.

19. The method according to claim 17, wherein the selecting is performed such that a pixel pair is selected according to pixel values of pixels and according to whether the pixels are located in an underexposed area, an overexposed area, or a well exposed area in the image data.

20. A non-transitory computer-readable storage medium storing a computer-executable program of instructions for causing a computer to perform the method according to claim 17.

21. The non-transitory computer-readable storage medium according to claim 20, wherein the selecting of the pixel set is performed based on a pixel value and a distance between a reference location and a pixel location.

22. The non-transitory computer-readable storage medium according to claim 20, wherein:
the selecting is performed so as to select a block pair based on an average pixel value of a block and a distance between a reference location and a predetermined location in a block; and
the generating of order information comprises calculating the order of magnitude between average pixel values of blocks in the selected block pairs.

23. The non-transitory computer-readable storage medium according to claim 20, wherein the selection is performed such that a pixel pair is selected according to pixel values of pixels and according to whether the pixels are located in an underexposed area, an overexposed area, or a well exposed area in the image data.

24. A method comprising:
acquiring image data and first verification data;
selecting a pixel set including a first pixel and a second pixel based on pixel values and information on an image space of the image data;
generating order information of the selected pixel set, wherein the order information includes at least information indicating a magnitude relationship between the first pixel and the second pixel;
generating second verification data, based on the order information;
comparing the first verification data with the second verification data; and
determining whether a process by which the magnitude relationship between the first pixel and the second pixel is changed is performed based on a result of the comparison,
wherein the first verification data is usable in verification when the process is performed on the image data, and the first verification data is generated using the order information including the information indicating the magnitude relationship between the first pixel and the second pixel, and
wherein the selecting selects the first pixel and the second pixel such that a distance between the first pixel and a center of a lens is greater than a distance between the second pixel and the center of the lens and a value of the first pixel is greater than a value of the second pixel.

25. The method according to claim 24, wherein in the case where the first verification data is equal to the second verification data, it is determined that the image data has not been tampered with, while in a case where the first verification data is not equal to the second verification data, it is determined that the image data has been tampered with.

* * * * *